United States Patent
Liu et al.

(10) Patent No.: US 11,528,751 B2
(45) Date of Patent: Dec. 13, 2022

(54) METHOD AND APPARATUS FOR RESOURCE ALLOCATION USING RANDOM ACCESS CONFIGURATION INFORMATION

(71) Applicant: Huawei Technologies Co., Ltd., Shenzhen (CN)

(72) Inventors: Jianqin Liu, Beijing (CN); Xiang Gao, Beijing (CN); Yongxing Zhou, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 43 days.

(21) Appl. No.: 17/039,581

(22) Filed: Sep. 30, 2020

(65) Prior Publication Data

US 2021/0022186 A1  Jan. 21, 2021

Related U.S. Application Data

(63) Continuation of application No. PCT/CN2019/081524, filed on Apr. 4, 2019.

(30) Foreign Application Priority Data

Apr. 4, 2018 (CN) .......................... 201810302376.6

(51) Int. Cl.
 H04W 4/00 (2018.01)
 H04W 74/08 (2009.01)
 H04W 72/04 (2009.01)

(52) U.S. Cl.
 CPC ... H04W 74/0833 (2013.01); H04W 72/0446 (2013.01)

(58) Field of Classification Search
 CPC ......... H04W 74/0833; H04W 72/0446; H04W 56/00; H04W 74/08
 See application file for complete search history.

(56) References Cited

U.S. PATENT DOCUMENTS

2011/0013542 A1\* 1/2011 Yu ...................... H04W 74/006
                                                               370/280
2014/0050157 A1   2/2014 Korhonen et al.
(Continued)

FOREIGN PATENT DOCUMENTS

CN    101252389 A    8/2008
CN    102271418 A    12/2011
(Continued)

OTHER PUBLICATIONS

Huawei et al., "Remaining details of RACH Preambles", 3GPP TSG RAN WG1 Meeting #92 R1-1801330, Feb. 26-Mar. 2, 2018, 39 pages, Athens, Greece.
(Continued)

Primary Examiner — Abdelnabi O Musa
(74) Attorney, Agent, or Firm — Slater Matsil, LLP

(57) ABSTRACT

This application discloses a communications method, and the method includes: receiving, by a terminal device, first information, where the first information is used to indicate one or more first time units in a random access system frame; and determining, by the terminal device, the one or more first time units based on the first information and a configuration table, where one or more time units in the configuration table are determined based on an uplink-downlink configuration period and a second time unit, the one or more first time units are an optional time domain resource of a random access sequence, and the second time unit is an optional time domain resource of a synchronization channel block. According to the method and the apparatus in this application, the optional time domain resource of the random access sequence can be determined.

14 Claims, 6 Drawing Sheets

(56) References Cited

U.S. PATENT DOCUMENTS

| | | | |
|---|---|---|---|
| 2014/0177623 A1 | 6/2014 | Dinan | |
| 2015/0156760 A1* | 6/2015 | Yu | H04W 72/0446 370/329 |
| 2016/0081122 A1* | 3/2016 | Tang | H04L 5/0055 370/329 |
| 2018/0110074 A1* | 4/2018 | Akkarakaran | H04W 72/0413 |
| 2018/0368181 A1* | 12/2018 | Lee | H04W 24/08 |
| 2020/0267803 A1* | 8/2020 | Kwak | H04W 74/0833 |
| 2020/0275479 A1* | 8/2020 | Peisa | H04W 74/04 |
| 2022/0007414 A1* | 1/2022 | Kim | H04W 56/00 |

FOREIGN PATENT DOCUMENTS

| | | |
|---|---|---|
| CN | 104349476 A | 2/2015 |
| CN | 105682232 A | 6/2016 |
| CN | 106162921 A | 11/2016 |
| CN | 106937400 A | 7/2017 |
| CN | 107371242 A | 11/2017 |
| CN | 107517501 A | 12/2017 |
| CN | 107770733 A | 3/2018 |
| CN | 109803421 A | 5/2019 |
| EP | 3282802 A1 | 2/2018 |

OTHER PUBLICATIONS

3GPP TS 38.211 V15.1.0 (Mar. 2018), 3rd Generation Partnership Project, Technical Specification Group Radio Access Network, NR, Physical channels and modulation (Release 15), 90 pages.

3GPP TS 38.213 V15.0.0 (Dec. 2017), 3rd Generation Partnership Project, Technical Specification Group Radio Access Network, NR, Physical layer procedures for control (Release 15), 56 pages.

3GPP TS 38.331 V15.1.0 (Mar. 2018), 3rd Generation Partnership Project, Technical Specification Group Radio Access Network, NR, Radio Resource Control (RRC) protocol specification (Release 15), 268 pages.

Qualcomm Incorporated, "Remaining Details on PRACH Formats", 3GPP TSG-RAN WG1 Meeting #90bis, R1-1718531, Oct. 9-13, 2017, 21 pages, Prague.

LG Electronics, "Discussion on PRACH preamble format details", 3GPP TSG RAN WG1 Meeting #91, R1-1719897, Nov. 27-Dec. 1, 2017, 10 pages, Reno, USA.

Qualcomm Incorporated, "Remaining Details on PRACH Formats", 3GPP TSG-RAN WG1 Meeting AH 1801, R1-1800850, Jan. 22-Jan. 26, 2018, 9 pages, Vancouver, Canada.

CMCC, "Discussion on PRACH configuration table", 3GPP TSG RAN WG1 Meeting #92, R1-1802032, Feb. 27-Mar. 2, 2018, 16 pages, Athens, Greece.

LG Electronics, "Discussion on PRACH preamble format details", 3GPP TSG RAN WG1 Meeting #92, R1-1802219, Feb. 26-Mar. 2, 2018, 11 pages, Athens, Greece.

* cited by examiner

METHOD AND APPARATUS FOR RESOURCE ALLOCATION USING RANDOM ACCESS CONFIGURATION INFORMATION

CROSS-REFERENCE TO RELATED APPLICATIONS

This application is a continuation of International Application No. PCT/CN2019/081524, filed on Apr. 4, 2019, which claims priority to Chinese Patent Application No. 201810302376.6, filed on Apr. 4, 2018. The disclosures of the aforementioned applications are hereby incorporated by reference in their entireties.

TECHNICAL FIELD

This application relates to the field of communications technologies, and in particular, to a communications method and apparatus.

BACKGROUND

Currently, in a random access procedure, a terminal device first needs to determine a time domain resource for sending a random access sequence. Currently, there is no related solution for how the terminal device determines the time domain resource for sending the random access sequence.

SUMMARY

This application provides a communications method and apparatus, so that a time domain resource used by a terminal device to send a random access sequence can be determined by using the method and the apparatus in this application.

According to a first aspect, this application provides a communications method, including: receiving, by a terminal device, first information, where the first information is used to indicate one or more first time units in a random access system frame; and determining, by the terminal device, the one or more first time units based on the first information and a configuration table, where one or more time units in the configuration table are determined based on an uplink-downlink configuration period and a second time unit, the one or more first time units are an optional time domain resource of a random access sequence, and the second time unit is an optional time domain resource of a synchronization channel block.

According to a second aspect, this application provides a communication method, including: determining, by a network device, first information based on a configuration table, where the first information is used to indicate one or more first time units in a random access system frame, one or more time units in the configuration table are determined based on an uplink-downlink configuration period and a second time unit, the one or more first time units are an optional time domain resource of a random access sequence, and the second time unit is an optional time domain resource of a synchronization channel block; and sending, by the network device, the first information.

In a possible design, that one or more time units in the configuration table are determined based on an uplink-downlink configuration period and a second time unit is specifically: the one or more time units in the configuration table are determined based on the uplink-downlink configuration period, the second time unit, and a third time unit, where the third time unit is an optional time domain resource of a control resource set.

In a possible design, that one or more time units in the configuration table are determined based on an uplink-downlink configuration period and a second time unit is specifically: determining a plurality of time domain intervals based on the uplink-downlink configuration period, where each time domain interval includes N time units, and N is an integer greater than or equal to 1; and determining the time unit in the configuration table based on the second $$\left\lfloor \frac{N}{2} \right\rfloor$$

time units in each time domain interval and the second time unit.

In a possible design, the determining the time unit in the configuration table based on the second $$\left\lfloor \frac{N}{2} \right\rfloor$$

time units in each time domain interval and the second time unit includes: determining the time unit in the configuration table based on the second $$\left\lfloor \frac{N}{2} \right\rfloor$$

time units in each time domain interval, the second time unit, and a third time unit, where the third time unit is an optional time domain resource of a control resource set.

In a possible design, the time unit in the configuration table is located in a first time domain set in the random access system frame, and the time unit in the configuration table does not overlap the second time unit; and the first time domain set is $$\left[ T_0 + k \cdot \frac{T_\Delta}{2},\ T_0 + (k+1) \cdot \frac{T_\Delta}{2} \right],$$

where $T_0$ represents a start moment of the random access system frame, $T_\Delta$ represents the uplink-downlink configuration period, k is an odd number greater than 0 and less than $$\left( \frac{2T_{frame}}{T_\Delta} - 1 \right),$$

and $T_{frame}$ represents duration of the random access system frame.

In a possible design, the time unit in the configuration table is a time unit corresponding to an odd index in the first time domain set.

In a possible design, one or more indexes, in the random access system frame, of the one or more time units in the configuration table satisfy one or more of the following conditions:

the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms;

the one or more indexes, in the random access system frame, of the one or more time units in the configuration table include one or more of {10, 11, 14, 15, 18, 19, 30, 31, 34, 35, 38, 39} if the uplink-downlink configuration period is 1 ms;

the one or more indexes, in the random access system frame, of the one or more time units in the configuration table include one or more of {4, 9, 13, 14, 18, 19, 29, 33, 34, 38, 39} if the uplink-downlink configuration period is 1.25 ms;

the one or more indexes, in the random access system frame, of the one or more time units in the configuration table include one or more of {4, 12, 13, 14, 15, 29, 30, 31, 36, 37, 38, 39} if the uplink-downlink configuration period is 2 ms;

the one or more indexes, in the random access system frame, of the one or more time units in the configuration table include one or more of {9, 15, 16, 17, 18, 19, 29, 35, 36, 37, 38, 39} if the uplink-downlink configuration period is 2.5 ms; or the one or more indexes, in the random access system frame, of the one or more time units in the configuration table include one or more of {10, 11, 12, 13, 14, 15, 16, 17, 18, 19, 30, 31, 32, 33, 34, 35, 36, 37, 38, 39} if the uplink-downlink configuration period is 5 ms.

In a possible design, the one or more indexes, in the random access system frame, of the one or more time units in the configuration table satisfy one or more of the following conditions:

the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms;

the one or more indexes, in the random access system frame, of the one or more time units in the configuration table include one or more of {11, 15, 19, 31, 35, 39} if the uplink-downlink configuration period is 1 ms;

the one or more indexes, in the random access system frame, of the one or more time units in the configuration table include one or more of {9, 13, 19, 29, 33, 39} if the uplink-downlink configuration period is 1.25 ms;

the one or more indexes, in the random access system frame, of the one or more time units in the configuration table include one or more of {13, 15, 29, 31, 37, 39} if the uplink-downlink configuration period is 2 ms;

the one or more indexes, in the random access system frame, of the one or more time units in the configuration table include one or more of {9, 15, 17, 19, 29, 35, 37, 39} if the uplink-downlink configuration period is 2.5 ms; or the one or more indexes, in the random access system frame, of the one or more time units in the configuration table include one or more of {11, 13, 15, 17, 19, 31, 33, 35, 37, 39} if the uplink-downlink configuration period is 5 ms.

In a possible design, the one or more indexes, in the random access system frame, of the one or more time units in the configuration table satisfy one or more of the following conditions:

the indexes, in the random access system frame, of the time units in the configuration table include {9, 11, 13, 15, 17, 19, 29, 31, 33, 35, 37, 39} if the uplink-downlink configuration period is 0.5 ms;

the indexes, in the random access system frame, of the time units in the configuration table include {1, 11, 14, 15, 18, 19, 30, 31, 34, 35, 38, 39} if the uplink-downlink configuration period is 1 ms;

the indexes, in the random access system frame, of the time units in the configuration table include {13, 14, 15, 29, 30, 31, 37, 38, 39} if the uplink-downlink configuration period is 2 ms; or the indexes, in the random access system frame, of the time units in the configuration table include {17, 19, 37, 39} if the uplink-downlink configuration period is 2.5 ms or 5 ms.

In a possible design, the one or more indexes, in the random access system frame, of the one or more time units in the configuration table satisfy one or more of the following conditions:

the indexes, in the random access system frame, of the time units in the configuration table include {15, 39} if the uplink-downlink configuration period is 0.5 ms;

the indexes, in the random access system frame, of the time units in the configuration table include {15, 31, 39} if the uplink-downlink configuration period is 1 ms;

indexes, in the random access system frame, of the first time units in the configuration table include {19, 39} if the uplink-downlink configuration period is 1.25 ms; or the indexes, in the random access system frame, of the time units in the configuration table include {15, 17, 19, 35, 37, 39} if the uplink-downlink configuration period is 2.5 ms.

In a possible design, the one or more indexes, in the random access system frame, of the one or more time units in the configuration table satisfy one or more of the following conditions:

the indexes, in the random access system frame, of the time units in the configuration table include {15, 39} and one or more of {9, 11, 13, 17, 19, 29, 31, 33, 35, 37} if the uplink-downlink configuration period is 0.5 ms;

the indexes, in the random access system frame, of the time units in the configuration table include {15, 31, 39} and one or more of {10, 11, 14, 18, 19, 30, 34, 35, 38} if the uplink-downlink configuration period is 1 ms;

the indexes, in the random access system frame, of the time units in the configuration table include {19, 39} and one or more of {4, 9, 13, 14, 18, 29, 33, 34, 38} if the uplink-downlink configuration period is 1.25 ms; or the indexes, in the random access system frame, of the time units in the configuration table include {15, 17, 19, 35, 37, 39} and one or more of {9, 16, 18, 29, 36, 38} if the uplink-downlink configuration period is 2.5 ms.

In a possible design, the one or more indexes, in the random access system frame, of the one or more time units in the configuration table satisfy one or more of the following conditions:

the indexes, in the random access system frame, of the time units in the configuration table include {11, 15, 19, 31, 35, 39} if the uplink-downlink configuration period is 0.5 ms or 1 ms;

the indexes, in the random access system frame, of the time units in the configuration table include {15, 17, 19, 35, 37, 39} if the uplink-downlink configuration period is 0.5 ms, 2.5 ms, or 5 ms;

the indexes, in the random access system frame, of the time units in the configuration table include {15, 31, 39} if the uplink-downlink configuration period is 0.5 ms, 1 ms, 2 ms, or 5 ms;

indexes, in the random access system frame, of the first time units in the configuration table include {9, 19, 29, 39} if the uplink-downlink configuration period is 1.25 ms or 2.5 ms;

the indexes, in the random access system frame, of the time units in the configuration table include {19, 39} if the uplink-downlink configuration period is 1.25 ms, 2.5 ms, or 5 ms; or indexes, in the random access system frame, of the first time units in the configuration table include {15, 19, 35, 39} if the uplink-downlink configuration period is 0.5 ms, 1 ms, 2.5 ms, or 5 ms.

In a possible design, the one or more indexes, in the random access system frame, of the one or more time units in the configuration table satisfy one or more of the following conditions:

the indexes, in the random access system frame, of the time units in the configuration table include {11, 15, 19, 31, 35, 39} and one or more of {9, 10, 13, 14, 17, 18, 29, 30, 33, 34, 37, 38} if the uplink-downlink configuration period is 0.5 ms or 1 ms;

the indexes, in the random access system frame, of the time units in the configuration table include {15, 17, 19, 35, 37, 39} and one or more of {9, 10, 11, 12, 13, 14, 16, 18, 29, 30, 31, 32, 33, 34, 36, 38} if the uplink-downlink configuration period is 0.5 ms, 2.5 ms, or 5 ms;

the indexes, in the random access system frame, of the time units in the configuration table include {15, 31, 39} and one or more of {4, 9, 10, 11, 12, 13, 14, 16, 17, 18, 19, 29, 30, 32, 33, 34, 35, 36, 37, 38} if the uplink-downlink configuration period is 0.5 ms, 1 ms, 2 ms, or 5 ms;

the indexes, in the random access system frame, of the time units in the configuration table include {9, 19, 29, 39} and one or more of {4, 13, 14, 15, 16, 17, 18, 33, 34, 35, 36, 37, 38} if the uplink-downlink configuration period is 1.25 ms or 2.5 ms;

the indexes, in the random access system frame, of the time units in the configuration table include {19, 39} and one or more of {4, 9, 10, 11, 12, 13, 14, 15, 16, 17, 18, 29, 30, 31, 32, 33, 34, 35, 36, 37, 38} if the uplink-downlink configuration period is 1.25 ms, 2.5 ms, or 5 ms; or the indexes, in the random access system frame, of the time units in the configuration table include {15, 19, 35, 39} and one or more of {9, 10, 11, 12, 13, 14, 16, 17, 18, 29, 30, 31, 32, 33, 34, 36, 37, 38} if the uplink-downlink configuration period is 0.5 ms, 1 ms, 2.5 ms, or 5 ms.

According to a third aspect, a communications method is provided. The method includes:

receiving, by a terminal device, first information;

determining, by the terminal device, one or more first time units based on the first information and a configuration table, where the one or more first time units are an optional time domain resource of a random access sequence, where one or more indexes, in a random access system frame, of one or more time units in the configuration table satisfy one or more of the following conditions:

the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms;

the one or more indexes, in the random access system frame, of the one or more time units in the configuration table include one or more of {10, 11, 14, 15, 18, 19, 30, 31, 34, 35, 38, 39} if the uplink-downlink configuration period is 1 ms;

the one or more indexes, in the random access system frame, of the one or more time units in the configuration table include one or more of {4, 9, 13, 14, 18, 19, 29, 33, 34, 38, 39} if the uplink-downlink configuration period is 1.25 ms;

the one or more indexes, in the random access system frame, of the one or more time units in the configuration table include one or more of {4, 12, 13, 14, 15, 29, 30, 31, 36, 37, 38, 39} if the uplink-downlink configuration period is 2 ms;

the one or more indexes, in the random access system frame, of the one or more time units in the configuration table include one or more of {9, 15, 16, 17, 18, 19, 29, 35, 36, 37, 38, 39} if the uplink-downlink configuration period is 2.5 ms; or the one or more indexes, in the random access system frame, of the one or more time units in the configuration table include one or more of {10, 11, 12, 13, 14, 15, 16, 17, 18, 19, 30, 31, 32, 33, 34, 35, 36, 37, 38, 39} if the uplink-downlink configuration period is 5 ms.

According to a fourth aspect, a communications method is provided. The communications method includes:

determining, by a network device, first information based on a configuration table, where the first information is used to indicate one or more first time units in a random access system frame, and the one or more first time units are an optional time domain resource of a random access sequence; and sending, by the network device, the first information, where one or more indexes, in the random access system frame, of one or more time units in the configuration table satisfy one or more of the following conditions:

the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms;

the one or more indexes, in the random access system frame, of the one or more time units in the configuration table include one or more of {10, 11, 14, 15, 18, 19, 30, 31, 34, 35, 38, 39} if the uplink-downlink configuration period is 1 ms;

the one or more indexes, in the random access system frame, of the one or more time units in the configuration table include one or more of {4, 9, 13, 14, 18, 19, 29, 33, 34, 38, 39} if the uplink-downlink configuration period is 1.25 ms;

the one or more indexes, in the random access system frame, of the one or more time units in the configuration table include one or more of {4, 12, 13, 14, 15, 29, 30, 31, 36, 37, 38, 39} if the uplink-downlink configuration period is 2 ms;

the one or more indexes, in the random access system frame, of the one or more time units in the configuration table include one or more of {9, 15, 16, 17, 18, 19, 29, 35, 36, 37, 38, 39} if the uplink-downlink configuration period is 2.5 ms; or the one or more indexes, in the random access system frame, of the one or more time units in the configuration table include one or more of {10, 11, 12, 13, 14, 15, 16, 17, 18, 19, 30, 31, 32, 33, 34, 35, 36, 37, 38, 39} if the uplink-downlink configuration period is 5 ms.

In a possible design, that the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms includes:

the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms;

that the one or more indexes, in the random access system frame, of the one or more time units in the configuration table include one or more of {10, 11, 14, 15, 18, 19, 30, 31, 34, 35, 38, 39} if the uplink-downlink configuration period is 1 ms includes:

the one or more indexes, in the random access system frame, of the one or more time units in the configuration table include one or more of {11, 15, 19, 31, 35, 39} if the uplink-downlink configuration period is 1 ms;

that the one or more indexes, in the random access system frame, of the one or more time units in the configuration table include one or more of {4, 9, 13, 14, 18, 19, 29, 33, 34, 38, 39} if the uplink-downlink configuration period is 1.25 ms includes:

the one or more indexes, in the random access system frame, of the one or more time units in the configuration table include one or more of {9, 13, 19, 29, 33, 39} if the uplink-downlink configuration period is 1.25 ms;

that the one or more indexes, in the random access system frame, of the one or more time units in the configuration table include one or more of {4, 12, 13, 14, 15, 29, 30, 31, 36, 37, 38, 39} if the uplink-downlink configuration period is 2 ms includes:

the one or more indexes, in the random access system frame, of the one or more time units in the configuration table include one or more of {13, 15, 29, 31, 37, 39} if the uplink-downlink configuration period is 2 ms;

that the one or more indexes, in the random access system frame, of the one or more time units in the configuration table include one or more of {9, 15, 16, 17, 18, 19, 29, 35, 36, 37, 38, 39} if the uplink-downlink configuration period is 2.5 ms includes:

the one or more indexes, in the random access system frame, of the one or more time units in the configuration table include one or more of {9, 15, 17, 19, 29, 35, 37, 39} if the uplink-downlink configuration period is 2.5 ms; or that the one or more indexes, in the random access system frame, of the one or more time units in the configuration table include one or more of {10, 11, 12, 13, 14, 15, 16, 17, 18, 19, 30, 31, 32, 33, 34, 35, 36, 37, 38, 39} if the uplink-downlink configuration period is 5 ms includes:

the one or more indexes, in the random access system frame, of the one or more time units in the configuration table include one or more of {11, 13, 15, 17, 19, 31, 33, 35, 37, 39} if the uplink-downlink configuration period is 5 ms.

In a possible design, that the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms includes:

the indexes, in the random access system frame, of the time units in the configuration table include {9, 11, 13, 15, 17, 19, 29, 31, 33, 35, 37, 39} if the uplink-downlink configuration period is 0.5 ms;

that the one or more indexes, in the random access system frame, of the one or more time units in the configuration table include one or more of {10, 11, 14, 15, 18, 19, 30, 31, 34, 35, 38, 39} if the uplink-downlink configuration period is 1 ms includes:

the indexes, in the random access system frame, of the time units in the configuration table include {1, 11, 14, 15, 18, 19, 30, 31, 34, 35, 38, 39} if the uplink-downlink configuration period is 1 ms;

that the one or more indexes, in the random access system frame, of the one or more time units in the configuration table include one or more of {4, 12, 13, 14, 15, 29, 30, 31, 36, 37, 38, 39} if the uplink-downlink configuration period is 2 ms includes:

the indexes, in the random access system frame, of the time units in the configuration table include {13, 14, 15, 29, 30, 31, 37, 38, 39} if the uplink-downlink configuration period is 2 ms;

that a slot included in the first optional time domain resource can be one or more of {9, 15, 16, 17, 18, 19, 29, 35, 36, 37, 38, 39} if the uplink-downlink configuration period is 2.5 ms includes:

the indexes, in the random access system frame, of the time units in the configuration table include {17, 19, 37, 39} if the uplink-downlink configuration period is 2.5 ms; or that the one or more indexes, in the random access system frame, of the one or more time units in the configuration table include one or more of {10, 11, 12, 13, 14, 15, 16, 17, 18, 19, 30, 31, 32, 33, 34, 35, 36, 37, 38, 39} if the uplink-downlink configuration period is 5 ms includes:

the indexes, in the random access system frame, of the time units in the configuration table include {17, 19, 37, 39} if the uplink-downlink configuration period is 5 ms.

In a possible design, that the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms includes:

the indexes, in the random access system frame, of the time units in the configuration table include {15, 39} if the uplink-downlink configuration period is 0.5 ms;

that the one or more indexes, in the random access system frame, of the one or more time units in the configuration table include one or more of {10, 11, 14, 15, 18, 19, 30, 31, 34, 35, 38, 39} if the uplink-downlink configuration period is 1 ms includes:

the indexes, in the random access system frame, of the time units in the configuration table include {15, 31, 39} if the uplink-downlink configuration period is 1 ms;

that the one or more indexes, in the random access system frame, of the one or more time units in the configuration table include one or more of {4, 9, 13, 14, 18, 19, 29, 33, 34, 38, 39} if the uplink-downlink configuration period is 1.25 ms includes:

the indexes, in the random access system frame, of the time units in the configuration table include {19, 39} if the uplink-downlink configuration period is 1.25 ms; or that the one or more indexes, in the random access system frame, of the one or more time units in the configuration table include one or more of {9, 15, 16, 17, 18, 19, 29, 35, 36, 37, 38, 39} if the uplink-downlink configuration period is 2.5 ms includes:

the indexes, in the random access system frame, of the time units in the configuration table include {15, 17, 19, 35, 37, 39} if the uplink-downlink configuration period is 2.5 ms.

In a possible design, that the one or more indexes, in the random access system frame, of the one or more first time units are one or more of {9, 11, 13, 15, 17, 19, 29, 31, 33, 35, 37, 39} if the uplink-downlink configuration period is 0.5 ms includes:

the indexes, in the random access system frame, of the time units in the configuration table include {15, 39} and one or more of {9, 11, 13, 17, 19, 29, 31, 33, 35, 37} if the uplink-downlink configuration period is 0.5 ms;

that the one or more indexes, in the random access system frame, of the one or more first time units are one or more of {10, 11, 14, 15, 18, 19, 30, 31, 34, 35, 38, 39} if the uplink-downlink configuration period is 1 ms includes:

the indexes, in the random access system frame, of the time units in the configuration table include {15, 31, 39} and one or more of {10, 11, 14, 18, 19, 30, 34, 35, 38} if the uplink-downlink configuration period is 1 ms;

that the one or more indexes, in the random access system frame, of the one or more first time units are one or more of {4, 9, 13, 14, 18, 19, 29, 33, 34, 38, 39} if the uplink-downlink configuration period is 1.25 ms includes:

the indexes, in the random access system frame, of the time units in the configuration table include {19, 39} and one or more of {4, 9, 13, 14, 18, 29, 33, 34, 38} if the uplink-downlink configuration period is 1.25 ms; or that a slot included in the first optional time domain resource can be one or more of {9, 15, 16, 17, 18, 19, 29, 35, 36, 37, 38, 39} if the uplink-downlink configuration period is 2.5 ms includes:

the indexes, in the random access system frame, of the time units in the configuration table include {15, 17, 19, 35, 37, 39} and one or more of {9, 16, 18, 29, 36, 38} if the uplink-downlink configuration period is 2.5 ms.

In a possible design, that the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms includes: the indexes, in the random access system frame, of the time units in the configuration table include {11, 15, 19, 31, 35, 39}, {15, 17, 19, 35, 37, 39}, {15, 31, 39}, or {15, 19, 35, 39} if the uplink-downlink configuration period is 0.5 ms;

that the one or more indexes, in the random access system frame, of the one or more time units in the configuration table include one or more of {10, 11, 14, 15, 18, 19, 30, 31, 34, 35, 38, 39} if the uplink-downlink configuration period is 1 ms includes:

the indexes, in the random access system frame, of the time units in the configuration table include {11, 15, 19, 31, 35, 39}, {15, 31, 39}, or {15, 19, 35, 39} if the uplink-downlink configuration period is 1 ms;

that the one or more indexes, in the random access system frame, of the one or more time units in the configuration table include one or more of {4, 9, 13, 14, 18, 19, 29, 33, 34, 38, 39} if the uplink-downlink configuration period is 1.25 ms includes:

the one or more indexes, in the random access system frame, of the one or more time units in the configuration table include {9, 19, 29, 39} or {19, 39} if the uplink-downlink configuration period is 1.25 ms;

that the one or more indexes, in the random access system frame, of the one or more time units in the configuration table include one or more of {9, 15, 16, 17, 18, 19, 29, 35, 36, 37, 38, 39} if the uplink-downlink configuration period is 2.5 ms includes:

the indexes, in the random access system frame, of the time units in the configuration table include {15, 17, 19, 35, 37, 39}, {9, 19, 29, 39}, {19, 39}, or {15, 19, 35, 39} if the uplink-downlink configuration period is 2.5 ms; or that the one or more indexes, in the random access system frame, of the one or more time units in the configuration table include one or more of {10, 11, 12, 13, 14, 15, 16, 17, 18, 19, 30, 31, 32, 33, 34, 35, 36, 37, 38, 39} if the uplink-downlink configuration period is 5 ms includes:

the indexes, in the random access system frame, of the time units in the configuration table include {15, 17, 19, 35, 37, 39}, {15, 31, 39}, {19, 39}, or {15, 19, 35, 39} if the uplink-downlink configuration period is 5 ms.

In a possible design, that one or more indexes, in the random access system frame, of the one or more first time units are one or more of {9, 11, 13, 15, 17, 19, 29, 31, 33, 35, 37, 39} if the uplink-downlink configuration period is 0.5 ms includes:

the indexes, in the random access system frame, of the time units in the configuration table include {11, 15, 19, 31, 35, 39} and one or more of {9, 13, 29, 33} if the uplink-downlink configuration period is 0.5 ms; or the indexes, in the random access system frame, of the time units in the configuration table include {15, 17, 19, 35, 37, 39} and one or more of {9, 13, 29, 33} if the uplink-downlink configuration period is 0.5 ms; or the indexes, in the random access system frame, of the time units in the configuration table include {15, 31, 39} and one or more of {9, 13, 29, 33} if the uplink-downlink configuration period is 0.5 ms; or the indexes, in the random access system frame, of the time units in the configuration table include {15, 19, 35, 39} and one or more of {9, 13, 29, 33} if the uplink-downlink configuration period is 0.5 ms;

that one or more indexes, in the random access system frame, of the one or more first time units are one or more of {10, 11, 14, 15, 18, 19, 30, 31, 34, 35, 38, 39} if the uplink-downlink configuration period is 1 ms includes:

the indexes, in the random access system frame, of the time units in the configuration table include {11, 15, 19, 31, 35, 39} and one or more of {10, 14, 18, 30, 34, 38} if the uplink-downlink configuration period is 1 ms; or the indexes, in the random access system frame, of the time units in the configuration table include {11, 15, 19, 31, 35, 39} and one or more of {10, 14, 18, 30, 34, 38} if the uplink-downlink configuration period is 1 ms; or the indexes, in the random access system frame, of the time units in the configuration table include {15, 31, 39} and one or more of {10, 14, 18, 30, 34, 38} if the uplink-downlink configuration period is 1 ms; or the indexes, in the random access system frame, of the time units in the configuration table include {15, 19, 35, 39} and one or more of {10, 14, 18, 30, 34, 38} if the uplink-downlink configuration period is 1 ms;

that one or more indexes, in the random access system frame, of the one or more first time units are one or more of {4, 9, 13, 14, 18, 19, 29, 33, 34, 38, 39} if the uplink-downlink configuration period is 1.25 ms includes:

the indexes, in the random access system frame, of the time units in the configuration table include {9, 19, 29, 39} and one or more of {4, 13, 14, 18, 33, 34, 38} if the uplink-downlink configuration period is 1.25 ms; or the indexes, in the random access system frame, of the time units in the configuration table include {19, 39} and one or more of {4, 13, 14, 18, 33, 34, 38} if the uplink-downlink configuration period is 1.25 ms;

that a slot included in the first optional time domain resource can be one or more of {9, 15, 16, 17, 18, 19, 29, 35, 36, 37, 38, 39} if the uplink-downlink configuration period is 2.5 ms includes:

the indexes, in the random access system frame, of the time units in the configuration table include {15, 17, 19, 35, 37, 39} and one or more of {16, 18, 36, 38} if the uplink-downlink configuration period is 2.5 ms; or the indexes, in the random access system frame, of the time units in the configuration table include {9, 19, 29, 39} and one or more of {16, 18, 36, 38} if the uplink-downlink configuration period is 2.5 ms; or the indexes, in the random access system frame, of the time units in the configuration table include {19, 39} and one or more of {16, 18, 36, 38} if the uplink-downlink configuration period is 2.5 ms; or the indexes, in the random access system frame, of the time units in the configuration table include {15, 19, 35, 39} and one or more of {16, 18, 36, 38} if the uplink-downlink configuration period is 2.5 ms; or that one or more indexes, in the random access system frame, of the one or more first time units are one or more of {10, 11, 12, 13, 14, 15, 16, 17, 18, 19, 30, 31, 32, 33, 34, 35, 36, 37, 38, 39} if the uplink-downlink configuration period is 5 ms includes:

the indexes, in the random access system frame, of the time units in the configuration table include {15, 17, 19, 35, 37, 39} and one or more of {10, 11, 12, 13, 14, 16, 18, 30, 32, 33, 34, 36, 38} if the uplink-downlink configuration period is 5 ms; or the indexes, in the random access system frame, of the time units in the configuration table include {15, 31, 39} and one or more of {10, 11, 12, 13, 14, 16, 18, 30, 32, 33, 34, 36, 38} if the uplink-downlink configuration period is 5 ms; or the indexes, in the random access system frame, of the time units in the configuration table include {19, 39} and one or more of {10, 11, 12, 13, 14, 16, 18, 30, 32, 33, 34, 36, 38} if the uplink-downlink configuration period is 5 ms; or the indexes, in the random access system frame, of the time units in the configuration table include {15, 19, 35, 39} and one or more of {10, 11, 12, 13, 14, 16, 18, 30, 32, 33, 34, 36, 38} if the uplink-downlink configuration period is 5 ms.

In a possible design, the one or more time units in the configuration table are determined based on the uplink-downlink configuration period and a second time unit, and the second time unit is an optional time domain resource of a synchronization channel block.

In a possible design, that the one or more time units in the configuration table are determined based on the uplink-downlink configuration period and a second time unit is specifically:

the one or more time units in the configuration table are determined based on the uplink-downlink configuration period, the second time unit, and a third time unit, where the third time unit is an optional time domain resource of a control resource set.

In a possible design, that the one or more time units in the configuration table are determined based on the uplink-downlink configuration period and a second time unit is specifically:

determining a plurality of time domain intervals based on the uplink-downlink configuration period, where each time domain interval includes N time units, and N is an integer greater than or equal to 1; and determining the time unit in the configuration table based on the second $$\left\lfloor \frac{N}{2} \right\rfloor$$

time units in each time domain interval and the second time unit.

In a possible design, the determining the time unit in the configuration table based on the second $$\left\lfloor \frac{N}{2} \right\rfloor$$

time units in each time domain interval and the second time unit includes:

determining the time unit in the configuration table based on the second $$\left\lfloor \frac{N}{2} \right\rfloor$$

time units in each time domain interval, the second time unit, and a third time unit, where the third time unit is an optional time domain resource of a control resource set.

In a possible design, the time unit in the configuration table is located in a first time domain set in the random access system frame, and the time unit in the configuration table does not overlap the second time unit; and the first time domain set is $$\left\lfloor T_0 + k \cdot \frac{T_\Delta}{2}, T_0 + (k+1) \cdot \frac{T_\Delta}{2} \right\rfloor,$$

where $T_0$ represents a start moment of the random access system frame, $T_\Delta$ represents the uplink-downlink configuration period, k is an odd number greater than 0 and less than $$\left( \frac{2T_{frame}}{T_\Delta} - 1 \right),$$

and $T_{frame}$ represents duration of the random access system frame.

In a possible design, the time unit in the configuration table is a time unit corresponding to an odd index in the first time domain set.

According to a fifth aspect, an embodiment of this application provides a communications apparatus, and the communications apparatus may perform any one of the foregoing methods.

In a possible design, the apparatus includes one or more processing units and a communications unit. The one or more processing units are configured to support the apparatus in performing a corresponding function of the terminal device or the network device in the foregoing method. The communications unit is configured to support the apparatus in communicating with another device, to implement a reception and/or transmission function, for example, receive a first message.

The apparatus may be a terminal device, a network device, or the like; and the communications unit may be a communications interface. Optionally, the communications unit may alternatively be an input/output circuit or an interface.

The apparatus may alternatively be a communications chip. The communications unit may be an input/output circuit or an interface of the communications chip.

In another possible design, the apparatus includes a communications interface and a processor. The processor is configured to control the communications interface to send and receive a signal. The processor is configured to run a computer program, so that the apparatus performs the communications method according to any one of the first aspect to the fifth aspect or the possible implementations thereof.

Optionally, the apparatus may further include a memory, where the memory is configured to store a computer program, and the processor may be specifically configured to run the computer program in the memory, so that the apparatus performs the communications method according to any one of the first aspect to the sixth aspect or the possible implementations thereof.

According to an eighth aspect, an embodiment of this application further provides a readable storage medium. The readable storage medium stores a program or an instruction, and when the program or the instruction is run on a computer, the communications method according to the foregoing aspects is performed.

According to a ninth aspect, an embodiment of this application further provides a computer program product including an instruction. When the computer program product is run on a computer, the computer is enabled to perform the communications method in the foregoing aspects.

According to a tenth aspect, a signal detection method is provided. The method includes: receiving, by user equipment, indication information, where the indication information is used to indicate configuration information of a control resource set of a control channel; the configuration information includes a time domain resource size, a frequency domain resource size, and a resource position; and the frequency domain resource size is 96 resource blocks and/or 192 resource blocks; and determining, by the user equipment, the configuration information of the control resource set based on the indication information, where the control resource set and a common signal block are frequency division multiplexed, and a subcarrier spacing of the control resource set is 120 kHz.

According to an eleventh aspect, a signal detection method is provided. The method includes: generating, by a network device, indication information, where the indication information is used to indicate configuration information of a control resource set of a control channel; the configuration information includes a time domain resource size, a frequency domain resource size, and a resource position; and the frequency domain resource size is 96 resource blocks and/or 192 resource blocks; and sending, by the network device, the indication information, where the control resource set and a common signal block are frequency division multiplexed, and a subcarrier spacing of the control resource set is 120 kHz.

According to a twelfth aspect, user equipment is provided. The user equipment includes a receiving unit and a processing unit. The receiving unit is configured to receive indication information. The indication information is used to indicate configuration information of a control resource set of a control channel, the configuration information includes a time domain resource size, a frequency domain resource size, and a resource position, and the frequency domain resource size is 96 resource blocks and/or 192 resource blocks. The processing unit is configured to determine the configuration information of the control resource set based on the indication information. The control resource set and a common signal block are frequency division multiplexed, and a subcarrier spacing of the control resource set is 120 kHz.

According to a thirteenth aspect, a network device is provided. The network device includes a processing unit and a sending unit. The processing unit is configured to generate indication information. The indication information is used to indicate configuration information of a control resource set of a control channel, the configuration information includes a time domain resource size, a frequency domain resource size, and a resource position, and the frequency domain resource size is 96 resource blocks and/or 192 resource blocks. The sending unit is configured to send the indication information. The control resource set and a common signal block are frequency division multiplexed, and a subcarrier spacing of the control resource set is 120 kHz.

According to a fourteenth aspect, a communications device is provided. The communications device includes a processor, a transceiver, and a memory. The memory stores an instruction, and when the instruction is run by the processor, the communications device is configured to perform the method according to the tenth aspect or the eleventh aspect.

According to a fifteenth aspect, a readable storage medium is provided. The readable storage medium includes an instruction, and when the instruction is run, the instruction is used to perform the method according to the tenth aspect or the eleventh aspect.

According to a sixteenth aspect, a chip is provided. When an instruction is run, the instruction may be used to perform the method according to the tenth aspect or the eleventh aspect.

In a possible implementation of any one of the eleventh aspect, the twelfth aspect, the thirteenth aspect, the fourteenth aspect, the fifteenth aspect, or the sixteenth aspect, the time domain resource size is two OFDM symbols.

In a possible implementation of any one of the eleventh aspect, the twelfth aspect, the thirteenth aspect, the fourteenth aspect, the fifteenth aspect, or the sixteenth aspect, the resource position is a frequency domain difference of −20 resource blocks or −21 resource blocks, defined by using the subcarrier spacing of the control resource set, between a minimum resource block index of the control resource set and a minimum common resource block index overlapping the first resource block of the common signal block.

In a possible implementation of any one of the eleventh aspect, the twelfth aspect, the thirteenth aspect, the fourteenth aspect, the fifteenth aspect, or the sixteenth aspect, the resource position is a frequency domain difference of 96 resource blocks, defined by using the subcarrier spacing of the control resource set, between a minimum resource block index of the control resource set and a minimum common resource block index overlapping the first resource block of the common signal block.

In a possible implementation of any one of the eleventh aspect, the twelfth aspect, the thirteenth aspect, the fourteenth aspect, the fifteenth aspect, or the sixteenth aspect, the resource position is a frequency domain difference of 192 resource blocks, defined by using the subcarrier spacing of the control resource set, between a minimum resource block index of the control resource set and a minimum common resource block index overlapping the first resource block of the common signal block.

According to a seventeenth aspect, a signal detection method is provided. The method includes:

receiving, by user equipment, indication information, where the indication information is used to indicate configuration information of a control resource set of a control channel; and determining, by the user equipment, the configuration information of the control resource set based on a configuration table and the indication information, where the configuration table is:

| Index | SSB and control resource set multiplexing pattern | Quantity $N_{RB}^{CORESET}$ of resource blocks | Quantity $N_{symb}^{CORESE}$ of OFDM symbols | Frequency domain offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 96 | 2 | −20 if a condition A is satisfied; or −21 if a condition B is satisfied |
| 5 | 3 | 96 | 2 | 96 |
| 6 | 3 | 192 | 2 | −20 if the condition A is satisfied; or −21 if the condition B is satisfied |
| 7 | 3 | 192 | 2 | 192 |
| 8 | Reserved | | | |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

According to an eighteenth aspect, a signal detection method is provided. The method includes:

receiving, by user equipment, indication information, where the indication information is used to indicate configuration information of a control resource set of a control channel; and determining, by the user equipment, the configuration information of the control resource set based on a configuration table and the indication information, where the configuration table is:

| Index | SSB and control resource set multiplexing pattern | Quantity $N_{RB}^{CORESET}$ of resource blocks | Quantity $N_{symb}^{CORESE}$ of OFDM symbols | Frequency domain offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if a condition A is satisfied; or −21 if a condition B is satisfied |
| 5 | 3 | 24 | 2 | 24 |
| 6 | 3 | 48 | 2 | −20 if the condition A is satisfied; or −21 if the condition B is satisfied |
| 7 | 3 | 48 | 2 | 48 |
| 8 | 3 | 96 | 2 | −20 if the condition A is satisfied; or −21 if the condition B is satisfied |
| 9 | 3 | 96 | 2 | 96 |
| 10 | Reserved | | | |
| 11 | Reserved | | | |
| 12 | Reserved | | | |
| 13 | Reserved | | | |
| 14 | Reserved | | | |
| 15 | Reserved | | | |

According to a nineteenth aspect, a signal detection method is provided. The method includes:

receiving, by user equipment, indication information, where the indication information is used to indicate configuration information of a control resource set of a control channel; and determining, by the user equipment, the configuration information of the control resource set based on a configuration table and the indication information, where the configuration table is:

| Index | SSB and control resource set multiplexing pattern | Quantity $N_{RB}^{CORESET}$ of resource blocks | Quantity $N_{symb}^{CORESE}$ of OFDM symbols | Frequency domain offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if a condition A is satisfied; or −21 if a condition B is satisfied |
| 5 | 3 | 24 | 2 | 24 |
| 6 | 3 | 48 | 2 | −20 if the condition A is satisfied; or −21 if the condition B is satisfied |
| 7 | 3 | 48 | 2 | 48 |
| 8 | 3 | 96 | 2 | −20 if the condition A is satisfied; or −21 if the condition B is satisfied |
| 9 | 3 | 96 | 2 | 96 |
| 10 | 3 | 192 | 2 | −20 if the condition A is satisfied; or −21 if the condition B is satisfied |
| 11 | 3 | 192 | 2 | 192 |
| 12 | Reserved | | | |
| 13 | Reserved | | | |
| 14 | Reserved | | | |
| 15 | Reserved | | | |

The twenty-sixth aspect, the eighteenth aspect, and the nineteenth aspect may alternatively be user equipment, a readable storage medium, or a chip.

DETAILED DESCRIPTION OF ILLUSTRATIVE EMBODIMENTS

Figure 1:
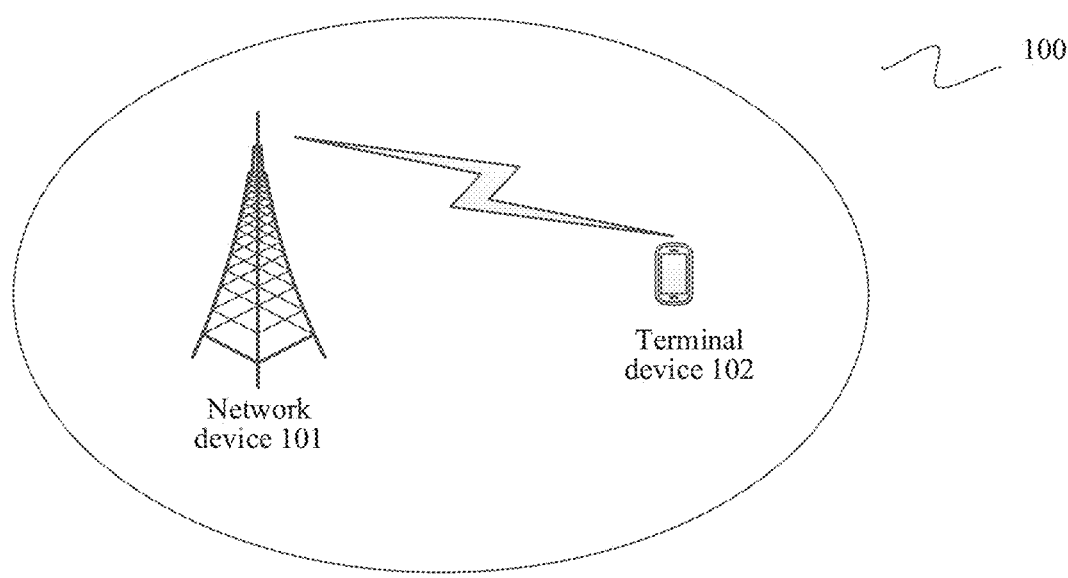
FIG. 1 is a schematic structural diagram of a communications system according to an embodiment of this application.

For ease of understanding, descriptions of concepts related to this application are provided for reference by using an example, shown as follows:

(1) Network device: The network device is a device that is in a network and that connects a terminal device to a wireless network. The network device is a node in a radio access network, and may also be referred to as a base station or a radio access network (RAN) node (or device). Currently, some network devices are, for example, a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wifi) access point (AP). In addition, in a network structure, the network device may include a centralized unit (CU) node and a distributed unit (DU) node. In this structure, a protocol layer of an eNB in a long term evolution (LTE) system is split, some functions of the protocol layer are controlled by a CU in a centralized manner, remaining or all functions of the protocol layer are distributed in DUs, and the CU controls the DUs in a centralized manner.

(2) Terminal device: The terminal device is also referred to as user equipment (UE), a mobile station (MS), a mobile terminal (MT), or the like, and is a device that provides a user with voice and/or data connectivity, for example, a handheld device or a vehicle-mounted device having a wireless connection function. Currently, some terminals are, for example, a mobile phone, a tablet computer, a notebook computer, a palmtop computer, a mobile internet device (MID), a wearable terminal, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, and a wireless terminal in a smart home.

(3) Communications system: The communications system may be various radio access technology (RAT) systems, for example, a code division multiple access (CDMA) system, a time division multiple access (TDMA) system, a frequency division multiple access (FDMA) system, an orthogonal frequency division multiple access (OFDMA) system, a single carrier frequency division multiple access (single carrier FDMA, SC-FDMA) system, and another system. The terms "system" and "network" may be interchanged. The CDMA system may implement wireless technologies such as universal terrestrial radio access (UTRA) and CDMA2000. The UTRA may include a wideband CDMA (WCDMA) technology and another variation technology of CDMA. CDMA2000 may cover interim standard (IS) 2000 (IS-2000), IS-95, and IS-856 standards. The TDMA system may implement a wireless technology such as a global system for mobile communications (GSM). The OFDMA system may implement wireless technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and Flash OFDMA. The UTRA and the E-UTRA are a UMTS and an evolved version of the UMTS. A new version of the UMTS that uses the E-UTRA is used in 3GPP long term evolution (LTE) and various versions evolved based on LTE. In addition, the communications system may be further applied to a future-oriented communications technology. Provided that a communications system using a new communication technology includes bearer establishment, the technical solutions provided in the embodiments of this application are applicable to the communications system. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

(4) Synchronization signal block (SSB): The SSB occupies four consecutive orthogonal frequency division multiplexing symbols, and the SSB may include an NR-PSS, an NR-SSS, and an NR-PBCH.

(5) Control resource set (CORESET): A function of the CORESET is similar to a function of a downlink control area in LTE. The CORESET includes a plurality of physical resource blocks in frequency domain and includes a plurality of orthogonal frequency division multiplexing symbols in time domain.

(6) Time unit: The time unit is essentially a time domain resource, and may be referred to as, but is not limited to, a slot, a subframe, a symbol, a frame, a transmission time interval (TTI), or the like.

In addition, it should be understood that in the descriptions of this application, words "first", "second" and the like are merely used for distinction description, and cannot be understood as an indication or implication of relative importance or an indication or implication of an order.

FIG. 1 shows a communications system 100 according to an embodiment of this application. The communications system 100 is mainly applied to a wireless communication scenario, and may include a network device 101 and a terminal device 102.

In this embodiment of this application, a process in which the terminal device 102 accesses the network device 101 may be as follows: First, the terminal device 102 searches a cell, to obtain system information of the cell, and the terminal device 102 may achieve downlink synchronization with the cell by using the system information of the cell. Then, the terminal device 102 may establish a connection to the cell and achieve uplink synchronization by using a random access procedure (RAP).

In an example of this application, a random access procedure of the terminal device 102 may be as follows: The terminal device 102 sends a random access sequence to the network device 101, and the random access sequence may also be referred to as a preamble sequence. After receiving the random access sequence, the network device 101 may send a random access response (RAP) to the terminal device 102, and the terminal device 102 may monitor a physical downlink control channel in an RAP time window to receive a corresponding RAP. After detecting the RAP, the terminal device 102 may send a third message to the network device 101. The network device 101 sends a contention resolution solution to the terminal device 102. In this embodiment of this application, the foregoing random access procedure is merely an example of this application, and does not constitute a limitation on an application scenario of this application.

Figure 2:
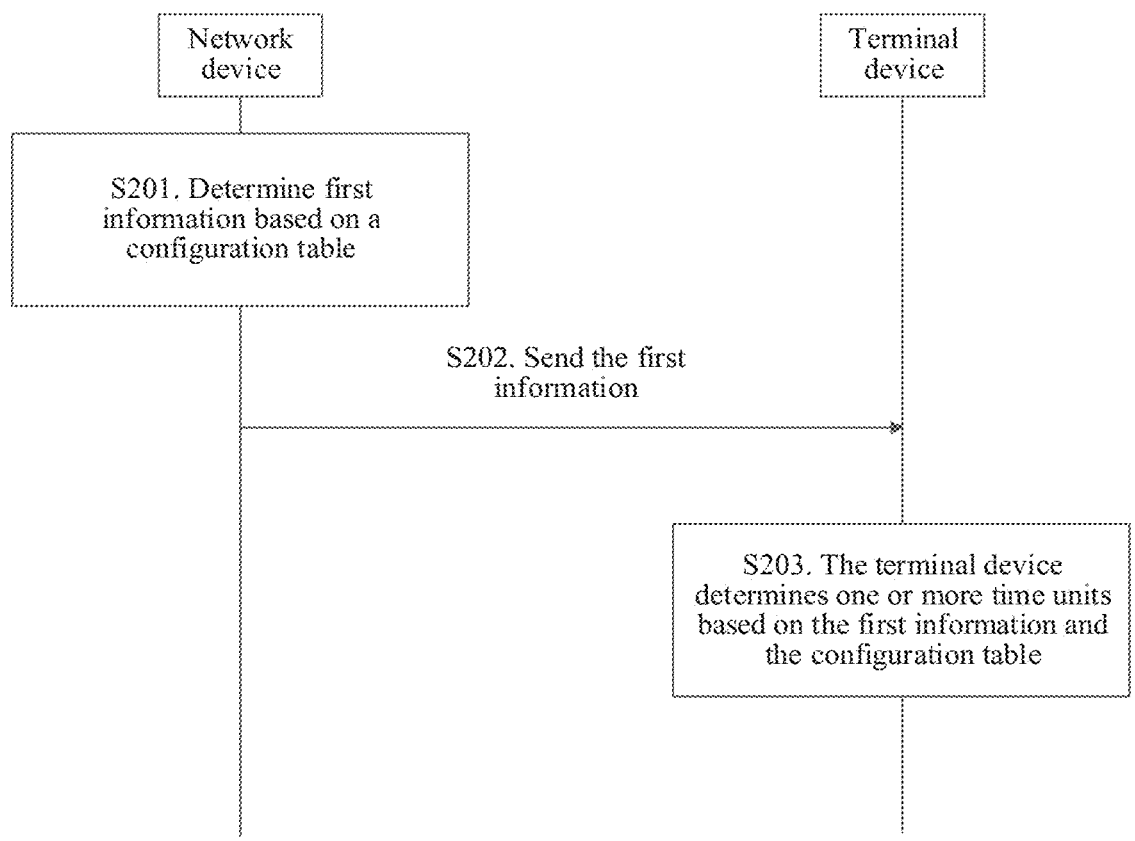
FIG. 2 is a schematic flowchart of a communications method according to an embodiment of this application.

For the foregoing scenario, this application provides a procedure of a communications method. In the procedure, a network device may correspond to the network device 101 in FIG. 1, and a terminal device may correspond to the terminal device 102 in FIG. 1. As shown in FIG. 2, the procedure is specifically as follows:

Step S201: The network device determines first information based on a configuration table.

The first information is used to indicate one or more first time units in X random access system frames, the one or more first time units are an optional time domain resource of a random access sequence, and X is an integer greater than or equal to 1.

Step S202: The network device sends the first information to the terminal device.

In this embodiment of this application, the configuration table may include a plurality of PRACH configuration options, and the first information may be specifically an index of a PRACH configuration option. For example, in the following Table 1, 256 PRACH configuration options may be configured in the entire configuration table. The first information may specifically indicate one or more of the foregoing 256 PRACH configuration options. More specifically, in the following embodiment shown in Table 1, each PRACH configuration option includes a PRACH configuration index, and the first information may be specifically used to indicate the PARCH configuration index.

Step S203: The terminal device determines one or more first time units based on the first information and the configuration table.

This application provides the following two manners of determining the one or more time units in the configuration table:

First manner: The time unit in the configuration table is determined based on an uplink-downlink configuration period and a second time unit, and the second time unit is an optional time domain resource of a synchronization signal block (SSB).

For the foregoing first manner, this application provides a specific implementation, which is specifically as follows: A plurality of time domain intervals may be determined based on the uplink-downlink configuration period. Each time domain interval is set to include N time units, where N is an integer greater than or equal to 1. Then, the first time unit may be determined based on the second $$\left\lfloor \frac{N}{2} \right\rfloor$$

time units in each time domain interval and the second time unit.

Specifically, in this embodiment of this application, the random access system frame may be divided into a plurality of time domain units based on the uplink-downlink configuration period. Each time domain unit is set to include N time units. In this case, the second $$\left\lfloor \frac{N}{2} \right\rfloor$$

time units in each time domain unit may be selected to form a first time domain set, and then the second time unit is removed from the first time domain set, so that the first time unit can be determined.

Figure 3:
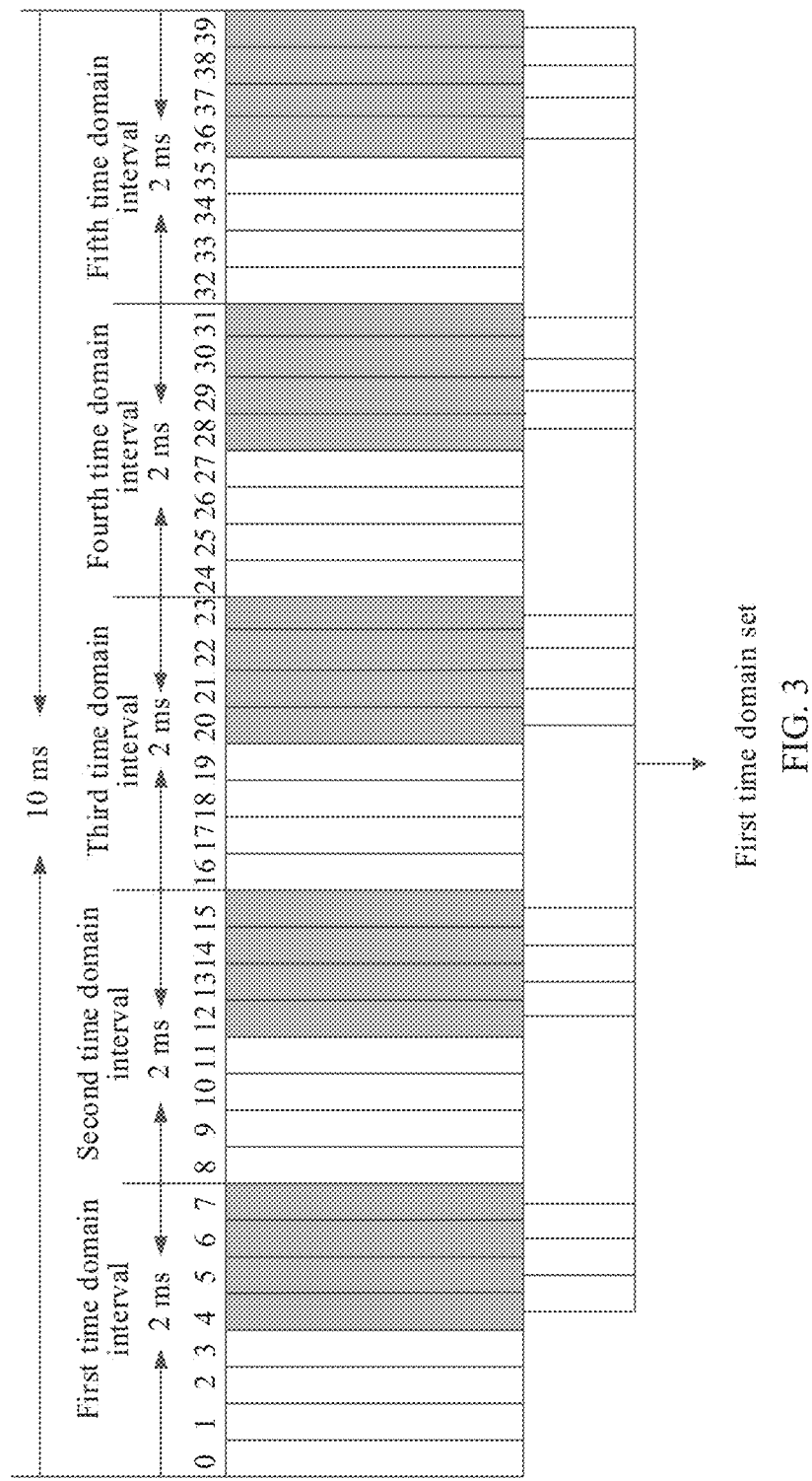
FIG. 3 is a schematic flowchart of a first time domain set according to an embodiment of this application.

In this embodiment of this application, as shown in FIG. 3, for example, if a length of the random access system frame is 10 ms, and the uplink-downlink configuration period is 2 ms, the random access system frame may be divided into five time domain intervals, and the five time domain intervals are respectively a first time domain interval, a second time domain interval, a third time domain interval, a fourth time domain interval, and a fifth time domain interval. If a RACH subcarrier spacing is 60 kHz, each of the five time domain intervals includes eight time units. It can be learned from FIG. 3 that indexes of the time units included in the first time domain interval are {0, 1, 2, 3, 4, 5, 6, 7}, indexes of the time units included in the second time domain interval are {8, 9, 10, 11, 12, 13, 14, 15}, indexes of the time units included in the third time domain interval are {16, 17, 18, 19, 20, 21, 22, 23}, indexes of the time units included in the fourth time domain interval are {24, 25, 26, 27, 28, 29, 30, 31}, and indexes of the time units included in the fifth time domain interval are {32, 33, 34, 35, 36, 37, 38, 39}.

In this embodiment of this application, the second half (namely, time units whose indexes are 4, 5, 6, and 7) of the first time domain interval, the second half (namely, time units whose indexes are 12, 13, 14, and 15) of the second time domain interval, the second half (namely, time units whose indexes are 20, 21, 22, and 23) of the third time domain interval, the second half (namely, time units whose indexes are 28, 29, 30, and 31) of the fourth time domain interval, and the second half (namely, time units whose indexes are 36, 37, 38, and 39) of the fifth time domain interval may form the first time domain set. To be specific, indexes of time units included in the first time domain set are {4, 5, 6, 7, 12, 13, 14, 15, 20, 21, 22, 23, 28, 29, 30, 31, 36, 37, 38, 39}. Then the second time unit (namely, the optional time domain resource of the SSB) is removed from the first time domain set, so that the time unit in the configuration table can be obtained. For example, the foregoing example is still used. The indexes of the time units included in the first time domain set are {4, 5, 6, 7, 12, 13, 14, 15, 20, 21, 22, 23, 28, 29, 30, 31, 36, 37, 38, 39}, and indexes of second time units are {5, 6, 7, 20, 21, 22, 23, 28}. In this case, indexes of the time units in the configuration table may be {4, 12, 13, 14, 15, 29, 30, 31, 36, 37, 38, 39}. The configuration table may specifically include one time unit, or may include a plurality of time units. This is not limited in this application.

The foregoing first manner may alternatively be expressed in the following manner: The time unit in the configuration table is located in a first time domain set in the random access system frame, and the first time unit does not overlap the second time unit; and the first time domain set may be specifically $$\left[T_0 + k \cdot \frac{T_\Delta}{2}, T_0 + (k+1) \cdot \frac{T_\Delta}{2}\right],$$

where $T_0$ represents a start moment of the random access system frame, $T_\Delta$ represents the uplink-downlink configuration period, k is an odd number greater than 0 and less than $$\left(\frac{2T_{frame}}{T_\Delta} - 1\right),$$

and $T_{frame}$ represents duration of the random access system frame.

In this embodiment of this application, when the start moment of the random access system frame is $T_0$=ms, the duration of the random access system frame is $T_{frame}$=10 ms, and the uplink-downlink configuration period is $T_\Delta$=2 ms, a value of k may be 1, 3, 5, 7, or 9. Correspondingly, time domain intervals included in the first time domain set are 1 ms to 2 ms, 3 ms to 4 ms, 5 ms to 6 ms, 7 ms to 8 ms, and 9 ms to 10 ms. Indexes of time units included in the first time domain set are {4, 5, 6, 7, 12, 13, 14, 15, 20, 21, 22, 23, 28, 29, 30, 31, 36, 37, 38, 39}.

In this embodiment of this application, in the foregoing first manner, one or more indexes, in the random access system frame, of the one or more time units in the configuration table satisfy one or more of the following conditions:

the one or more indexes, in the random access system frame, of the one or more time units in the configuration table are one or more of {9, 11, 13, 15, 17, 19, 29, 31, 33, 35, 37, 39} if the uplink-downlink configuration period is 0.5 ms;

the one or more indexes, in the random access system frame, of the one or more time units in the configuration table are one or more of {10, 11, 14, 15, 18, 19, 30, 31, 34, 35, 38, 39} if the uplink-downlink configuration period is 1 ms;

the one or more indexes, in the random access system frame, of the one or more time units in the configuration table are one or more of {4, 9, 13, 14, 18, 19, 29, 33, 34, 38, 39} if the uplink-downlink configuration period is 1.25 ms;

the one or more indexes, in the random access system frame, of the one or more time units in the configuration table are one or more of {4, 12, 13, 14, 15, 29, 30, 31, 36, 37, 38, 39} if the uplink-downlink configuration period is 2 ms;

the one or more indexes, in the random access system frame, of the one or more time units in the configuration table are one or more of {9, 15, 16, 17, 18, 19, 29, 35, 36, 37, 38, 39} if the uplink-downlink configuration period is 2.5 ms; or the one or more indexes, in the random access system frame, of the one or more time units in the configuration table are one or more of {10, 11, 12, 13, 14, 15, 16, 17, 18, 19, 30, 31, 32, 33, 34, 35, 36, 37, 38, 39} if the uplink-downlink configuration period is 5 ms.

In the foregoing first manner, it can be determined that the optional time domain resource (namely, the first time unit) of the random access sequence is located in a time unit in the second half of the entire uplink-downlink configuration period, and does not collide with the optional time domain resource of the SSB.

Second manner: The time unit in the configuration table is generated based on an uplink-downlink configuration period, a second time unit, and a third time unit, the second time unit is an optional time domain resource of an SSB, and the third time unit is an optional time domain resource of a control resource set (CORESET).

For the foregoing second manner, this application provides a specific implementation: A plurality of time domain intervals may be determined based on the uplink-downlink configuration period. Each time domain interval is set to include N time units, where N is an integer greater than or equal to 1. Then, the time unit in the configuration table may be determined based on the second $$\left\lfloor \frac{N}{2} \right\rfloor$$

time units in each time domain interval, the second time unit, and the third time unit.

Specifically, in this embodiment of this application, the random access system frame may be divided into a plurality of time domain units based on the uplink-downlink configuration period. Each time domain unit is set to include N time units. In this case, the second $$\left\lfloor \frac{N}{2} \right\rfloor$$

time units in each time domain unit may be selected to form a first time domain set, then time units corresponding to odd indexes are selected from the first time domain set, and finally the second time unit is removed from the time units with the odd indexes, so that the first time unit can be determined.

The foregoing example is still used. As shown in FIG. 3, the first time domain set is first determined. For how to determine the first time domain set, refer to the descriptions in the first manner, and details are not described herein again. Then, the time units corresponding to the odd indexes are determined in the first time domain set. Finally, the second time unit (namely, the optional time domain resource of the SSB) is removed from the time units with the odd indexes, so that the time unit in the configuration table can be determined. The time units with the odd indexes are selected from the first time domain set, so that a probability of collision between the optional time domain resource of the random access sequence and the optional time domain resource of the CORESET can be reduced.

For example, the foregoing example is still used. The indexes of the time units included in the first time domain set are {4, 5, 6, 7, 12, 13, 14, 15, 20, 21, 22, 23, 28, 29, 30, 31, 36, 37, 38, 39}. In this case, in the foregoing indexes, odd indexes may be {5, 7, 13, 15, 21, 23, 29, 31, 37, 39}. In addition, indexes of second time units (namely, optional time domain resources of the SSB) are set to {5, 7, 21, 23}, so that obtained indexes of the time units in the configuration table may be specifically {13, 15, 29, 31, 37, 39} after the indexes {5, 7, 21, 23} of the second time units are removed from the odd indexes {5, 7, 13, 15, 21, 23, 29, 31, 37, 39}.

In this embodiment of this application, if the second manner is used, one or more indexes, in the random access system frame, of the one or more time units in the configuration table satisfy one or more of the following conditions:

one or more indexes, in the random access system frame, of the one or more time units are one or more of {9, 11, 13, 15, 17, 19, 29, 31, 33, 35, 37, 39} if the uplink-downlink configuration period is 0.5 ms;

one or more indexes, in the random access system frame, of the one or more time units are one or more of {11, 15, 19, 31, 35, 39} if the uplink-downlink configuration period is 1 ms;

one or more indexes, in the random access system frame, of the one or more time units are one or more of {9, 13, 19, 29, 33, 39} if the uplink-downlink configuration period is 1.25 ms;

one or more indexes, in the random access system frame, of the one or more time units are one or more of {13, 15, 29, 31, 37, 39} if the uplink-downlink configuration period is 2 ms;

one or more indexes, in the random access system frame, of the one or more time units are one or more of {9, 15, 17, 19, 29, 35, 37, 39} if the uplink-downlink configuration period is 2.5 ms; or one or more indexes, in the random access system frame, of the one or more time units are one or more of {11, 13, 15, 17, 19, 31, 33, 35, 37, 39} if the uplink-downlink configuration period is 5 ms.

In the foregoing manner, it can be ensured that the optional time domain resource (namely, the first time unit) of the random access sequence is located in a time unit in the second half of the entire uplink-downlink configuration period, does not collide with the optional time domain resource of the SSB, and has a relatively small probability of collision with the optional time domain resource of the control resource set.

In another example of this application, a solution of the one or more indexes, in the random access system frame, of the one or more time units in the configuration table is further disclosed. In this example, the one or more indexes, in the random access system frame, of the one or more time units in the configuration table may satisfy one or more of the following conditions:

the indexes, in the random access system frame, of the time units in the configuration table include {9, 11, 13, 15, 17, 19, 29, 31, 33, 35, 37, 39} if the uplink-downlink configuration period is 0.5 ms;

the indexes, in the random access system frame, of the time units in the configuration table include {1, 11, 14, 15, 18, 19, 30, 31, 34, 35, 38, 39} if the uplink-downlink configuration period is 1 ms;

the indexes, in the random access system frame, of the time units in the configuration table include {13, 14, 15, 29, 30, 31, 37, 38, 39} if the uplink-downlink configuration period is 2 ms; or the indexes, in the random access system frame, of the time units in the configuration table include {17, 19, 37, 39} if the uplink-downlink configuration period is 2.5 ms or 5 ms.

In another example of this application, a solution of the one or more indexes, in the random access system frame, of the one or more time units in the configuration table is further disclosed. In this example, the one or more indexes, in the random access system frame, of the one or more time units in the configuration table may satisfy one or more of the following conditions:

the indexes, in the random access system frame, of the time units in the configuration table include {15, 39} if the uplink-downlink configuration period is 0.5 ms;

the indexes, in the random access system frame, of the time units in the configuration table include {15, 31, 39} if the uplink-downlink configuration period is 1 ms;

indexes, in the random access system frame, of the time units in the configuration table include {19, 39} if the uplink-downlink configuration period is 1.25 ms; or the indexes, in the random access system frame, of the time units in the configuration table include {15, 17, 19, 35, 37, 39} if the uplink-downlink configuration period is 2.5 ms.

In another example of this application, a solution of the one or more indexes, in the random access system frame, of the one or more time units in the configuration table in the random access system frame is further disclosed. In this example, the one or more indexes, in the random access system frame, of the one or more time units in the configuration table may satisfy one or more of the following conditions:

the indexes, in the random access system frame, of the time units in the configuration table include {15, 39} and one or more of {9, 11, 13, 17, 19, 29, 31, 33, 35, 37} if the uplink-downlink configuration period is 0.5 ms;

the indexes, in the random access system frame, of the time units in the configuration table include {15, 31, 39} and one or more of {10, 11, 14, 18, 19, 30, 34, 35, 38} if the uplink-downlink configuration period is 1 ms;

the indexes, in the random access system frame, of the time units in the configuration table include {19, 39} and one or more of {4, 9, 13, 14, 18, 29, 33, 34, 38} if the uplink-downlink configuration period is 1.25 ms; or the indexes, in the random access system frame, of the time units in the configuration table include {15, 17, 19, 35, 37, 39} and one or more of {9, 16, 18, 29, 36, 38} if the uplink-downlink configuration period is 2.5 ms.

In another example of this application, a solution of the one or more indexes, in the random access system frame, of the one or more time units in the configuration table in the random access system frame is further disclosed. In this example, the one or more indexes, in the random access system frame, of the one or more time units in the configuration table may satisfy one or more of the following conditions:

the indexes, in the random access system frame, of the time units in the configuration table include {11, 15, 19, 31, 35, 39} if the uplink-downlink configuration period is 0.5 ms or 1 ms;

the indexes, in the random access system frame, of the time units in the configuration table include {15, 17, 19, 35, 37, 39} if the uplink-downlink configuration period is 0.5 ms, 2.5 ms, or 5 ms;

the indexes, in the random access system frame, of the time units in the configuration table include {15, 31, 39} if the uplink-downlink configuration period is 0.5 ms, 1 ms, 2 ms, or 5 ms;

indexes, in the random access system frame, of the first time units in the configuration table include {9, 19, 29, 39} if the uplink-downlink configuration period is 1.25 ms or 2.5 ms;

the indexes, in the random access system frame, of the time units in the configuration table include {19, 39} if the uplink-downlink configuration period is 1.25 ms, 2.5 ms, or 5 ms; or indexes, in the random access system frame, of the first time units in the configuration table include {15, 19, 35, 39} if the uplink-downlink configuration period is 0.5 ms, 1 ms, 2.5 ms, or 5 ms.

In another example of this application, a solution of the one or more indexes, in the random access system frame, of the one or more time units in the configuration table in the random access system frame is further disclosed. In this example, the one or more indexes, in the random access system frame, of the one or more time units in the configuration table may satisfy one or more of the following conditions:

the indexes, in the random access system frame, of the time units in the configuration table include {11, 15, 19, 31, 35, 39} and one or more of {9, 10, 13, 14, 17, 18, 29, 30, 33, 34, 37, 38} if the uplink-downlink configuration period is 0.5 ms or 1 ms;

the indexes, in the random access system frame, of the time units in the configuration table include {15, 17, 19, 35, 37, 39} and one or more of {9, 10, 11, 12, 13, 14, 16, 18, 29, 30, 31, 32, 33, 34, 36, 38} if the uplink-downlink configuration period is 0.5 ms, 2.5 ms, or 5 ms;

the indexes, in the random access system frame, of the time units in the configuration table include {15, 31, 39} and one or more of {4, 9, 10, 11, 12, 13, 14, 16, 17, 18, 19, 29, 30, 32, 33, 34, 35, 36, 37, 38} if the uplink-downlink configuration period is 0.5 ms, 1 ms, 2 ms, or 5 ms;

the indexes, in the random access system frame, of the time units in the configuration table include {9, 19, 29, 39} and one or more of {4, 13, 14, 15, 16, 17, 18, 33, 34, 35, 36, 37, 38} if the uplink-downlink configuration period is 1.25 ms or 2.5 ms;

the indexes, in the random access system frame, of the time units in the configuration table include {19, 39} and one or more of {4, 9, 10, 11, 12, 13, 14, 15, 16, 17, 18, 29, 30, 31, 32, 33, 34, 35, 36, 37, 38} if the uplink-downlink configuration period is 1.25 ms, 2.5 ms, or 5 ms; or the indexes, in the random access system frame, of the time units in the configuration table include {15, 19, 35, 39} and one or more of {9, 10, 11, 12, 13, 14, 16, 17, 18, 29, 30, 31, 32, 33, 34, 36, 37, 38} if the uplink-downlink configuration period is 0.5 ms, 1 ms, 2.5 ms, or 5 ms.

In another example of this application, a solution of the one or more indexes, in the random access system frame, of the one or more time units in the configuration table in the random access system frame is further disclosed. In this example, the one or more indexes, in the random access system frame, of the one or more time units in the configuration table may satisfy one or more of the following conditions:

the indexes, in the random access system frame, of the time units in the configuration table include {11, 15, 19, 31, 35, 39} and one or more of {9, 13, 29, 33} if the uplink-downlink configuration period is 0.5 ms;

the indexes, in the random access system frame, of the time units in the configuration table include {15, 17, 19, 35, 37, 39} and one or more of {9, 13, 29, 33} if the uplink-downlink configuration period is 0.5 ms;

the indexes, in the random access system frame, of the time units in the configuration table include {15, 31, 39} and one or more of {9, 13, 29, 33} if the uplink-downlink configuration period is 0.5 ms;

the indexes, in the random access system frame, of the time units in the configuration table include {15, 19, 35, 39} and one or more of {9, 13, 29, 33} if the uplink-downlink configuration period is 0.5 ms;

the indexes, in the random access system frame, of the time units in the configuration table include {11, 15, 19, 31, 35, 39} and one or more of {10, 14, 18, 30, 34, 38} if the uplink-downlink configuration period is 1 ms;

the indexes, in the random access system frame, of the time units in the configuration table include {11, 15, 19, 31, 35, 39} and one or more of {10, 14, 18, 30, 34, 38} if the uplink-downlink configuration period is 1 ms;

the indexes, in the random access system frame, of the time units in the configuration table include {15, 31, 39} and one or more of {10, 14, 18, 30, 34, 38} if the uplink-downlink configuration period is 1 ms;

the indexes, in the random access system frame, of the time units in the configuration table include {15, 19, 35, 39} and one or more of {10, 14, 18, 30, 34, 38} if the uplink-downlink configuration period is 1 ms;

the indexes, in the random access system frame, of the time units in the configuration table include {9, 19, 29, 39} and one or more of {4, 13, 14, 18, 33, 34, 38} if the uplink-downlink configuration period is 1.25 ms;

the indexes, in the random access system frame, of the time units in the configuration table include {19, 39} and one or more of {4, 13, 14, 18, 33, 34, 38} if the uplink-downlink configuration period is 1.25 ms;

the indexes, in the random access system frame, of the time units in the configuration table include {15, 17, 19, 35, 37, 39} and one or more of {16, 18, 36, 38} if the uplink-downlink configuration period is 2.5 ms;

the indexes, in the random access system frame, of the time units in the configuration table include {9, 19, 29, 39} and one or more of {16, 18, 36, 38} if the uplink-downlink configuration period is 2.5 ms;

the indexes, in the random access system frame, of the time units in the configuration table include {19, 39} and one or more of {16, 18, 36, 38} if the uplink-downlink configuration period is 2.5 ms;

the indexes, in the random access system frame, of the time units in the configuration table include {15, 19, 35, 39} and one or more of {16, 18, 36, 38} if the uplink-downlink configuration period is 2.5 ms;

the indexes, in the random access system frame, of the time units in the configuration table include {15, 17, 19, 35, 37, 39} and one or more of {10, 11, 12, 13, 14, 16, 18, 30, 32, 33, 34, 36, 38} if the uplink-downlink configuration period is 5 ms;

the indexes, in the random access system frame, of the time units in the configuration table include {15, 31, 39} and one or more of {10, 11, 12, 13, 14, 16, 18, 30, 32, 33, 34, 36, 38} if the uplink-downlink configuration period is 5 ms;

the indexes, in the random access system frame, of the time units in the configuration table include {19, 39} and one or more of {10, 11, 12, 13, 14, 16, 18, 30, 32, 33, 34, 36, 38} if the uplink-downlink configuration period is 5 ms; or the indexes, in the random access system frame, of the time units in the configuration table include {15, 19, 35, 39} and one or more of {10, 11, 12, 13, 14, 16, 18, 30, 32, 33, 34, 36, 38} if the uplink-downlink configuration period is 5 ms.

The one or more indexes, in the random access system frame, of the one or more time units in the configuration table further satisfy:

The indexes, in the random access system frame, of the time units are divided into at least two index subsets, each index subset includes at least two indexes satisfying a first interval, and further, elements at corresponding positions in the two index subsets include two indexes satisfying a second interval. The second interval is not equal to a product of a quantity of indexes included in the index subset and the first interval.

Optionally, when the quantity of indexes included in each index subset can be greater than or equal to 3, the one or more indexes, in the random access system frame, of the one or more time units in the configuration table satisfy: There are at least four indexes of the time units, where there is a uniform interval between every two of three neighboring indexes, and a difference between a remaining index and the first index or the last index in the three neighboring indexes is not equal to the uniform interval.

Optionally, the indexes, in the random access system frame, of the time units in the configuration table include at least two index subsets, and each index subset includes at least two indexes satisfying a first interval. For example, {15, 17, 19, 35, 37, 39} may be divided into two index subsets {15, 17, 19} and {35, 37, 39}, where first intervals in {15, 17, 19} are both 2, and first intervals in {35, 37, 39} are both 2. Further, optionally, indexes of corresponding positions of the two index subsets include indexes satisfying a second interval. The second interval is not equal to a product of a quantity of indexes included in the index subset and the first interval. For example, {15, 17, 19, 35, 37, 39} may be divided into two index subsets {15, 17, 19} and {35, 37, 39}, where the second interval between 15 and 35 is 20, the second interval between 17 and 37 is 20, and the second interval between 19 and 39 is 20.

Optionally, the indexes, in the random access system frame, of the time units in the configuration table include at least two index subsets; and in one index subset, there is a uniform interval between every two of at least three neighboring indexes, and an interval between a remaining index and any one of the three neighboring indexes is not equal to the uniform interval. For example, in {9, 15, 16, 17, 18, 19, 29, 35, 36, 37, 38, 39}, there may be two index subsets {9, 15, 16, 17, 18, 19} and {29, 35, 36, 37, 38, 39}. In {9, 15, 16, 17, 18, 19}, uniform intervals between every two of 15, 16, 17, 18, and 19 are 1 (an interval between 15 and 16 is 1, an interval between 16 and 17 is 1, an interval between 17 and 18 is 1, and an interval between 18 and 19 is 1), and an interval between 9 and any one of 15, 16, 17, 18, and 19 is not equal to 1, to be specific, not equal to the uniform interval. Further, optionally, indexes of corresponding positions of the two index subsets include indexes satisfying a second interval. For example, in the two index subsets {9, 15, 16, 17, 18, 19} and {29, 35, 36, 37, 38, 39}, the second interval between 9 and 29 is 20, a second interval between 15 and 35 is 20, the second interval between 16 and 36 is 20, a second interval between 17 and 37 is 20, the second interval between 18 and 38 is 20, and the second interval between 19 and 39 is 20.

Figure 4:
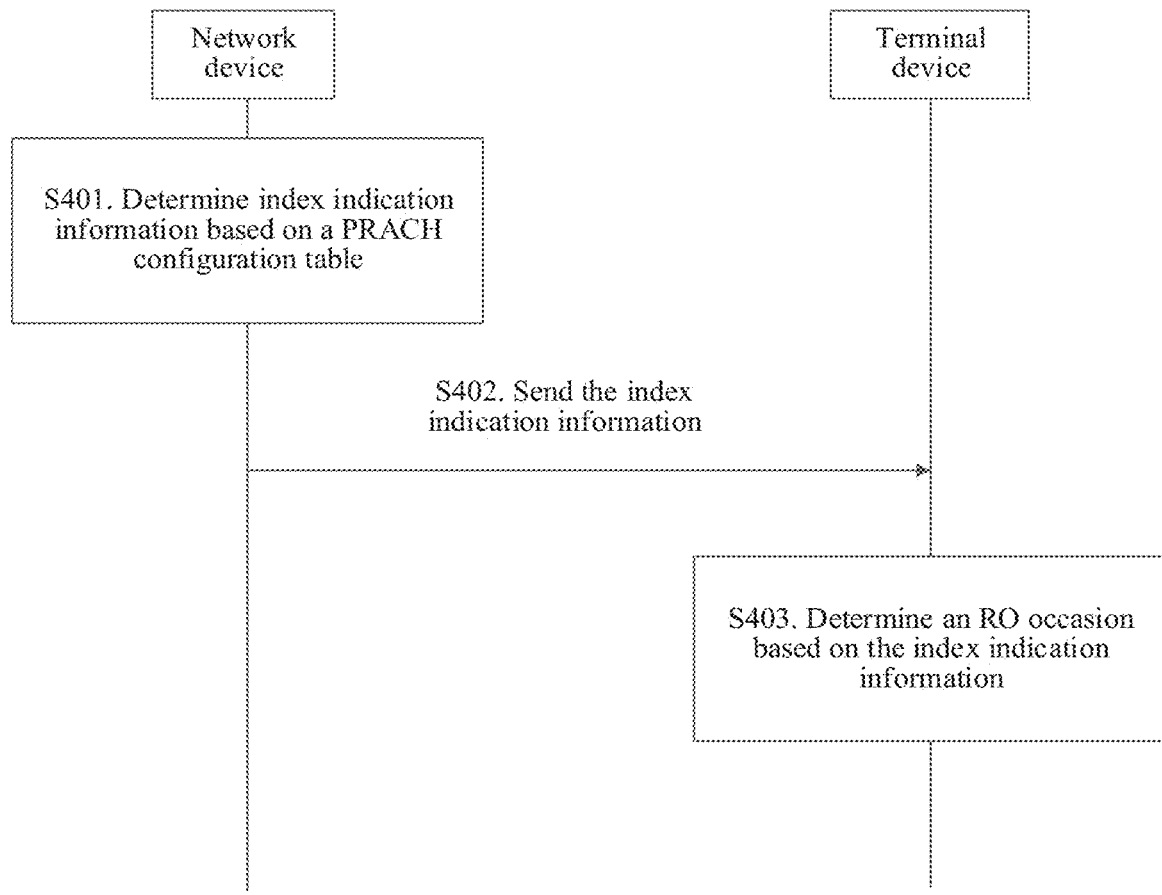
FIG. 4 is a schematic flowchart of a communications method according to an embodiment of this application.

As shown in FIG. 4, this application provides a communication procedure. In the communication procedure shown in FIG. 4, an example in which a time unit is a slot (slot) is specifically used for description. A physical random access channel (physical random access channel, PRACH) configuration table in the procedure shown in FIG. 4 may correspond to the configuration table in the procedure shown in FIG. 2, index indication information in the procedure shown in FIG. 4 may correspond to the first message in the procedure shown in FIG. 2, and a RACH occasion (RO) in the procedure shown in FIG. 4 may correspond to the optional time domain resource of the random access sequence in the procedure shown in FIG. 2. As shown in FIG. 4, the procedure is specifically as follows:

Step S401: A network device determines the index indication information based on the PRACH configuration table.

The index indication information is at least used to indicate an index of a slot in which the PRACH occasion may be located in a system frame. The slot in which the PRACH occasion may be located may be referred to as a PARCH slot. In the PRACH configuration table, a PRACH may be configured to satisfy the following characteristics: (1) The PRACH occasion locates in a slot included in the second half of an uplink-downlink configuration period. (2) The PRACH occasion locates in a slot other than an optional slot of an SSB. (3) In all optional configurations of a CORESET, the PRACH occasion has a smallest collision probability with an optional time domain position of the CORESET.

Step S402: The network device sends the index indication information to a terminal device.

Step S403: The terminal device determines the RO occasion based on the index indication information.

In this embodiment of this application, a PRACH configuration table is provided. The PRACH configuration table may include one or more of the following parameters:

(1) PRACH configuration sequence numbers, where optional values are 0 to 255;

(2) a random access preamble sequence format, where in this embodiment of this application, the random access sequence format may include a long sequence format and a short sequence format, the long sequence format may be specifically 0 to 3, and the short sequence format may be specifically A1, A2, A3, B1, B4, A1/B1, A2/B2, A3/B3, C0, or C2;

(3) a PRACH configuration period parameter, where optional values are {1, 2, 4, 8, 16}; and in this embodiment of this application, a PRACH configuration period may be 10 ms, 20 ms, 40 ms, 80 ms, or 160 ms;

(4) a RACH system frame number (system frame number, SNF);

(5) a quantity of PRACH slots, where in this embodiment of this application, for a communication frequency band below 6 GHz, the quantity of PRACH slots is specifically a quantity of PRACH slots included in a duration granularity of 1 ms; and for a frequency band above 6 GHz, the quantity of RACH slots is specifically a quantity of PRACH slots included in a duration granularity of 0.25 ms;

(6) a PRACH slot (slot) sequence number;

(7) a PRACH start symbol; and (8) a quantity of PRACH occasions (RO) included in each PRACH slot.

Based on the foregoing descriptions, as shown in Table 1, this application provides a PRACH configuration table. The PRACH configuration table may include 256 PRACH configuration options, and each PRACH configuration option may include five parameters, which are respectively a PRACH configuration index, a preamble sequence format, a RACH system frame number (SFN mod x=y, where SNF is a system frame number, and x is a PRACH configuration period parameter), a slot index, a start symbol, a quantity of PRACH slots included in a slot corresponding to a subcarrier spacing of 60 kHz, and a quantity of time-domain physical random access channel occasions included in a RACH slot. In an example of this application, as shown in Table 1, a PRACH configuration table is specifically provided:

TABLE 1

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
| --- | --- | --- | --- | --- | --- | --- | --- |
| | | x | y | | | | |
| 0 | A1 | 1 | 0 | 4, 9, 14, 19, 24, 29, 34, 39 | 0 | 2 | 6 |
| 1 | A1 | 1 | 0 | 4, 9, 14, 19, 24, 29, 34, 39 | 7 | 1 | 3 |
| 2 | A1 | 1 | 0 | 24, 29, 34, 39 | 0 | 2 | 6 |
| 3 | A1 | 1 | 0 | 24, 29, 34, 39 | 7 | 1 | 3 |
| 4 | A1 | 1 | 0 | 17, 19, 37, 39 | 0 | 2 | 6 |
| 5 | A1 | 1 | 0 | 17, 19, 37, 39 | 7 | 1 | 3 |
| 6 | A1 | 1 | 0 | 0, 1, 2, . . . , 39 | 0 | 2 | 6 |
| 7 | A1 | 1 | 0 | 0, 1, 2, . . . , 39 | 7 | 1 | 3 |
| 8 | A1 | 1 | 0 | 23, 27, 31, 35, 39 | 0 | 2 | 6 |
| 9 | A1 | 1 | 0 | 23, 27, 31, 35, 39 | 7 | 1 | 3 |
| 10 | A1 | 1 | 0 | 3, 7, 11, 15, 19, 23, 27, 31, 35, 39 | 0 | 2 | 6 |
| 11 | A1 | 1 | 0 | 3, 7, 11, 15, 19, 23, 27, 31, 35, 39 | 7 | 1 | 3 |
| 12 | A1 | 1 | 0 | 1, 3, 5, 7, . . . , 37, 39 | 0 | 2 | 6 |
| 13 | A1 | 1 | 0 | 7, 15, 23, 31, 39 | 0 | 2 | 6 |
| 14 | A1 | 1 | 0 | 7, 15, 23, 31, 39 | 7 | 1 | 3 |
| 15 | A1 | 16 | 0 | 4, 9, 14, 19, 24, 29, 34, 39 | 0 | 2 | 6 |
| 16 | A1 | 16 | 1 | 3, 7, 11, 15, 19, 23, 27, 31, 35, 39 | 7 | 1 | 3 |
| 17 | A1 | 8 | 1 | 4, 9, 14, 19, 24, 29, 34, 39 | 0 | 2 | 6 |
| 18 | A1 | 8 | 1 | 3, 7, 11, 15, 19, 23, 27, 31, 35, 39 | 7 | 1 | 3 |
| 19 | A1 | 4 | 1 | 4, 9, 14, 19, 24, 29, 34, 39 | 0 | 2 | 6 |
| 20 | A1 | 4 | 1 | 3, 7, 11, 15, 19, 23, 27, 31, 35, 39 | 7 | 1 | 3 |
| 21 | A1 | 2 | 1 | 4, 9, 14, 19, 24, 29, 34, 39 | 0 | 2 | 6 |
| 22 | A1 | 2 | 1 | 3, 7, 11, 15, 19, 23, 27, 31, 35, 39 | 7 | 1 | 3 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 23 | A1 | 1 | 0 | 13, 15, 21, 23, 29, 31, 37, 39 | 0 | 1 | 6 |
| 24 | A1 | 1 | 0 | 1, 3, 5, 7, . . . , 37, 39 | 7 | 1 | 3 |
| 25 | A1 | 1 | 0 | 9, 11, 13, 15, 17, 19, 29, 31, 33, 35, 37, 39 | 7 | 2 | 3 |
| 26 | A1 | 1 | 0 | 10, 11, 14, 15, 18, 19, 30, 31, 34, 35, 38, 39 | 7 | 2 | 3 |
| 27 | A1 | 1 | 0 | 13, 14, 15, 29, 30, 31, 37, 38, 39 | 7 | 2 | 3 |
| 28 | A2 | 1 | 0 | 4, 9, 14, 19, 24, 29, 34, 39 | 0 | 2 | 6 |
| 29 | A2 | 1 | 0 | 4, 9, 14, 19, 24, 29, 34, 39 | 9 | 1 | 1 |
| 30 | A2 | 1 | 0 | 24, 29, 34, 39 | 0 | 2 | 3 |
| 31 | A2 | 1 | 0 | 24, 29, 34, 39 | 9 | 1 | 1 |
| 32 | A2 | 1 | 0 | 17, 19, 37, 39 | 0 | 2 | 3 |
| 33 | A2 | 1 | 0 | 17, 19, 37, 39 | 9 | 1 | 1 |
| 34 | A2 | 1 | 0 | 0, 1, 2, . . . , 39 | 0 | 2 | 3 |
| 35 | A2 | 1 | 0 | 0, 1, 2, . . . , 39 | 9 | 1 | 1 |
| 36 | A2 | 1 | 0 | 23, 27, 31, 35, 39 | 0 | 2 | 3 |
| 37 | A2 | 1 | 0 | 23, 27, 31, 35, 39 | 9 | 1 | 1 |
| 38 | A2 | 1 | 0 | 3, 7, 11, 15, 19, 23, 27, 31, 35, 39 | 0 | 2 | 3 |
| 39 | A2 | 1 | 0 | 3, 7, 11, 15, 19, 23, 27, 31, 35, 39 | 9 | 1 | 1 |
| 40 | A2 | 1 | 0 | 1, 3, 5, 7, . . . , 37, 39 | 0 | 2 | 3 |
| 41 | A2 | 1 | 0 | 7, 15, 23, 31, 39 | 0 | 2 | 3 |
| 42 | A2 | 1 | 0 | 7, 15, 23, 31, 39 | 9 | 1 | 1 |
| 43 | A2 | 16 | 0 | 4, 9, 14, 19, 24, 29, 34, 39 | 0 | 2 | 3 |
| 44 | A2 | 16 | 1 | 3, 7, 11, 15, 19, 23, 27, 31, 35, 39 | 9 | 1 | 1 |
| 45 | A2 | 8 | 1 | 4, 9, 14, 19, 24, 29, 34, 39 | 0 | 2 | 3 |
| 46 | A2 | 8 | 1 | 3, 7, 11, 15, 19, 23, 27, 31, 35, 39 | 9 | 1 | 1 |
| 47 | A2 | 4 | 1 | 4, 9, 14, 19, 24, 29, 34, 39 | 0 | 2 | 3 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 48 | A2 | 4 | 1 | 3, 7, 11, 15, 19, 23, 27, 31, 35, 39 | 9 | 1 | 1 |
| 49 | A2 | 2 | 1 | 4, 9, 14, 19, 24, 29, 34, 39 | 0 | 2 | 3 |
| 50 | A2 | 2 | 1 | 3, 7, 11, 15, 19, 23, 27, 31, 35, 39 | 9 | 1 | 1 |
| 51 | A2 | 1 | 0 | 13, 15, 21, 23, 29, 31, 37, 39 | 0 | 1 | 3 |
| 52 | A2 | 1 | 0 | 1, 3, 5, 7, . . . , 37, 39 | 9 | 1 | 1 |
| 53 | A2 | 1 | 0 | 9, 11, 13, 15, 17, 19, 29, 31, 33, 35, 37, 39 | 9 | 2 | 1 |
| 54 | A2 | 1 | 0 | 10, 11, 14, 15, 18, 19, 30, 31, 34, 35, 38, 39 | 9 | 2 | 1 |
| 55 | A2 | 1 | 0 | 13, 14, 15, 29, 30, 31, 37, 38, 39 | 9 | 2 | 1 |
| 56 | A3 | 1 | 0 | 4, 9, 14, 19, 24, 29, 34, 39 | 0 | 2 | 6 |
| 57 | A3 | 1 | 0 | 4, 9, 14, 19, 24, 29, 34, 39 | 7 | 1 | 1 |
| 58 | A3 | 1 | 0 | 24, 29, 34, 39 | 0 | 2 | 2 |
| 59 | A3 | 1 | 0 | 24, 29, 34, 39 | 7 | 1 | 1 |
| 60 | A3 | 1 | 0 | 17, 19, 37, 39 | 0 | 2 | 2 |
| 61 | A3 | 1 | 0 | 17, 19, 37, 39 | 7 | 1 | 1 |
| 62 | A3 | 1 | 0 | 0, 1, 2, . . . , 39 | 0 | 2 | 2 |
| 63 | A3 | 1 | 0 | 0, 1, 2, . . . , 39 | 7 | 1 | 1 |
| 64 | A3 | 1 | 0 | 23, 27, 31, 35, 39 | 0 | 2 | 2 |
| 65 | A3 | 1 | 0 | 23, 27, 31, 35, 39 | 7 | 1 | 1 |
| 66 | A3 | 1 | 0 | 3, 7, 11, 15, 19, 23, 27, 31, 35, 39 | 0 | 2 | 2 |
| 67 | A3 | 1 | 0 | 3, 7, 11, 15, 19, 23, 27, 31, 35, 39 | 7 | 1 | 1 |
| 68 | A3 | 1 | 0 | 1, 3, 5, 7, . . . , 37, 39 | 0 | 2 | 2 |
| 69 | A3 | 1 | 0 | 7, 15, 23, 31, 39 | 0 | 2 | 2 |
| 70 | A3 | 1 | 0 | 7, 15, 23, 31, 39 | 7 | 1 | 1 |
| 71 | A3 | 16 | 0 | 4, 9, 14, 19, 24, 29, 34, 39 | 0 | 2 | 2 |
| 72 | A3 | 16 | 1 | 3, 7, 11, 15, 19, 23, 27, 31, 35, 39 | 7 | 1 | 1 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 73 | A3 | 8 | 1 | 4, 9, 14, 19, 24, 29, 34, 39 | 0 | 2 | 2 |
| 74 | A3 | 8 | 1 | 3, 7, 11, 15, 19, 23, 27, 31, 35, 39 | 7 | 1 | 1 |
| 75 | A3 | 4 | 1 | 4, 9, 14, 19, 24, 29, 34, 39 | 0 | 2 | 2 |
| 76 | A3 | 4 | 1 | 3, 7, 11, 15, 19, 23, 27, 31, 35, 39 | 7 | 1 | 1 |
| 77 | A3 | 2 | 1 | 4, 9, 14, 19, 24, 29, 34, 39 | 0 | 2 | 2 |
| 78 | A3 | 2 | 1 | 3, 7, 11, 15, 19, 23, 27, 31, 35, 39 | 7 | 1 | 1 |
| 79 | A3 | 1 | 0 | 13, 15, 21, 23, 29, 31, 37, 39 | 0 | 1 | 2 |
| 80 | A3 | 1 | 0 | 1, 3, 5, 7, . . . , 37, 39 | 7 | 1 | 1 |
| 81 | A3 | 1 | 0 | 9, 11, 13, 15, 17, 19, 29, 31, 33, 35, 37, 39 | 7 | 2 | 1 |
| 82 | A3 | 1 | 0 | 10, 11, 14, 15, 18, 19, 30, 31, 34, 35, 38, 39 | 7 | 2 | 1 |
| 83 | A3 | 1 | 0 | 13, 14, 15, 29, 30, 31, 37, 38, 39 | 7 | 2 | 1 |
| 84 | B1 | 1 | 0 | 4, 9, 14, 19, 24, 29, 34, 39 | 2 | 2 | 6 |
| 85 | B1 | 1 | 0 | 4, 9, 14, 19, 24, 29, 34, 39 | 8 | 1 | 3 |
| 86 | B1 | 1 | 0 | 24, 29, 34, 39 | 2 | 2 | 6 |
| 87 | B1 | 1 | 0 | 24, 29, 34, 39 | 8 | 1 | 3 |
| 88 | B1 | 1 | 0 | 17, 19, 37, 39 | 2 | 2 | 6 |
| 89 | B1 | 1 | 0 | 17, 19, 37, 39 | 8 | 1 | 3 |
| 90 | B1 | 1 | 0 | 0, 1, 2, . . . , 39 | 2 | 2 | 6 |
| 91 | B1 | 1 | 0 | 0, 1, 2, . . . , 39 | 8 | 1 | 3 |
| 92 | B1 | 1 | 0 | 23, 27, 31, 35, 39 | 2 | 2 | 6 |
| 93 | B1 | 1 | 0 | 23, 27, 31, 35, 39 | 8 | 1 | 3 |
| 94 | B1 | 1 | 0 | 3, 7, 11, 15, 19, 23, 27, 31, 35, 39 | 2 | 2 | 6 |
| 95 | B1 | 1 | 0 | 3, 7, 11, 15, 19, 23, 27, 31, 35, 39 | 8 | 1 | 3 |
| 96 | B1 | 1 | 0 | 1, 3, 5, 7, . . . , 37, 39 | 2 | 2 | 6 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 97 | B1 | 1 | 0 | 7, 15, 23, 31, 39 | 2 | 2 | 6 |
| 98 | B1 | 1 | 0 | 7, 15, 23, 31, 39 | 8 | 1 | 3 |
| 99 | B1 | 16 | 0 | 4, 9, 14, 19, 24, 29, 34, 39 | 2 | 2 | 6 |
| 100 | B1 | 16 | 1 | 3, 7, 11, 15, 19, 23, 27, 31, 35, 39 | 8 | 1 | 3 |
| 101 | B1 | 8 | 1 | 4, 9, 14, 19, 24, 29, 34, 39 | 2 | 2 | 6 |
| 102 | B1 | 8 | 1 | 3, 7, 11, 15, 19, 23, 27, 31, 35, 39 | 8 | 1 | 3 |
| 103 | B1 | 4 | 1 | 4, 9, 14, 19, 24, 29, 34, 39 | 2 | 2 | 6 |
| 104 | B1 | 4 | 1 | 3, 7, 11, 15, 19, 23, 27, 31, 35, 39 | 8 | 1 | 3 |
| 105 | B1 | 2 | 1 | 4, 9, 14, 19, 24, 29, 34, 39 | 2 | 2 | 6 |
| 106 | B1 | 2 | 1 | 3, 7, 11, 15, 19, 23, 27, 31, 35, 39 | 8 | 1 | 3 |
| 107 | B1 | 1 | 0 | 13, 15, 21, 23, 29, 31, 37, 39 | 2 | 1 | 6 |
| 108 | B1 | 1 | 0 | 1, 3, 5, 7, ..., 37, 39 | 8 | 1 | 3 |
| 109 | B1 | 1 | 0 | 9, 11, 13, 15, 17, 19, 29, 31, 33, 35, 37, 39 | 8 | 2 | 3 |
| 110 | B1 | 1 | 0 | 10, 11, 14, 15, 18, 19, 30, 31, 34, 35, 38, 39 | 8 | 2 | 3 |
| 111 | B1 | 1 | 0 | 13, 14, 15, 29, 30, 31, 37, 38, 39 | 8 | 2 | 3 |
| 112 | B4 | 1 | 0 | 4, 9, 14, 19, 24, 29, 34, 39 | 0 | 2 | 1 |
| 113 | B4 | 1 | 0 | 4, 9, 14, 19, 24, 29, 34, 39 | 2 | 1 | 1 |
| 114 | B4 | 1 | 0 | 24, 29, 34, 39 | 0 | 2 | 1 |
| 115 | B4 | 1 | 0 | 24, 29, 34, 39 | 2 | 1 | 1 |
| 116 | B4 | 1 | 0 | 17, 19, 37, 39 | 0 | 2 | 1 |
| 117 | B4 | 1 | 0 | 17, 19, 37, 39 | 2 | 1 | 1 |
| 118 | B4 | 1 | 0 | 0, 1, 2, ..., 39 | 0 | 2 | 1 |
| 119 | B4 | 1 | 0 | 0, 1, 2, ..., 39 | 2 | 1 | 1 |
| 120 | B4 | 1 | 0 | 23, 27, 31, 35, 39 | 0 | 2 | 1 |
| 121 | B4 | 1 | 0 | 23, 27, 31, 35, 39 | 2 | 1 | 1 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 122 | B4 | 1 | 0 | 3, 7, 11, 15, 19, 23, 27, 31, 35, 39 | 0 | 2 | 1 |
| 123 | B4 | 1 | 0 | 3, 7, 11, 15, 19, 23, 27, 31, 35, 39 | 2 | 1 | 1 |
| 124 | B4 | 1 | 0 | 1, 3, 5, 7, . . . , 37, 39 | 0 | 2 | 1 |
| 125 | B4 | 1 | 0 | 7, 15, 23, 31, 39 | 0 | 2 | 1 |
| 126 | B4 | 1 | 0 | 7, 15, 23, 31, 39 | 2 | 1 | 1 |
| 127 | B4 | 16 | 0 | 4, 9, 14, 19, 24, 29, 34, 39 | 0 | 2 | 1 |
| 128 | B4 | 16 | 1 | 3, 7, 11, 15, 19, 23, 27, 31, 35, 39 | 2 | 1 | 1 |
| 129 | B4 | 8 | 1 | 4, 9, 14, 19, 24, 29, 34, 39 | 0 | 2 | 1 |
| 130 | B4 | 8 | 1 | 3, 7, 11, 15, 19, 23, 27, 31, 35, 39 | 2 | 1 | 1 |
| 131 | B4 | 4 | 1 | 4, 9, 14, 19, 24, 29, 34, 39 | 0 | 2 | 1 |
| 132 | B4 | 4 | 1 | 3, 7, 11, 15, 19, 23, 27, 31, 35, 39 | 2 | 1 | 1 |
| 133 | B4 | 2 | 1 | 4, 9, 14, 19, 24, 29, 34, 39 | 0 | 2 | 1 |
| 134 | B4 | 2 | 1 | 3, 7, 11, 15, 19, 23, 27, 31, 35, 39 | 2 | 1 | 1 |
| 135 | B4 | 1 | 0 | 13, 15, 21, 23, 29, 31, 37, 39 | 0 | 1 | 1 |
| 136 | B4 | 1 | 0 | 1, 3, 5, 7, . . . , 37, 39 | 2 | 1 | 1 |
| 137 | B4 | 1 | 0 | 9, 11, 13, 15, 17, 19, 29, 31, 33, 35, 37, 39 | 2 | 2 | 1 |
| 138 | B4 | 1 | 0 | 10, 11, 14, 15, 18, 19, 30, 31, 34, 35, 38, 39 | 2 | 2 | 1 |
| 139 | B4 | 1 | 0 | 13, 14, 15, 29, 30, 31, 37, 38, 39 | 2 | 2 | 1 |
| 140 | A1/B1 | 1 | 0 | 4, 9, 14, 19, 24, 29, 34, 39 | 2 | 2 | 6 |
| 141 | A1/B1 | 1 | 0 | 4, 9, 14, 19, 24, 29, 34, 39 | 8 | 1 | 3 |
| 142 | A1/B1 | 1 | 0 | 24, 29, 34, 39 | 2 | 2 | 6 |
| 143 | A1/B1 | 1 | 0 | 24, 29, 34, 39 | 8 | 1 | 3 |
| 144 | A1/B1 | 1 | 0 | 17, 19, 37, 39 | 2 | 2 | 6 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 145 | A1/B1 | 1 | 0 | 17, 19, 37, 39 | 8 | 1 | 3 |
| 146 | A1/B1 | 1 | 0 | 0, 1, 2, . . . , 39 | 2 | 2 | 6 |
| 147 | A1/B1 | 1 | 0 | 0, 1, 2, . . . , 39 | 8 | 1 | 3 |
| 148 | A1/B1 | 1 | 0 | 23, 27, 31, 35, 39 | 2 | 2 | 6 |
| 149 | A1/B1 | 1 | 0 | 23, 27, 31, 35, 39 | 8 | 1 | 3 |
| 150 | A1/B1 | 1 | 0 | 3, 7, 11, 15, 19, 23, 27, 31, 35, 39 | 2 | 2 | 6 |
| 151 | A1/B1 | 1 | 0 | 3, 7, 11, 15, 19, 23, 27, 31, 35, 39 | 8 | 1 | 3 |
| 152 | A1/B1 | 1 | 0 | 1, 3, 5, 7, . . . , 37, 39 | 2 | 2 | 6 |
| 153 | A1/B1 | 1 | 0 | 7, 15, 23, 31, 39 | 2 | 2 | 6 |
| 154 | A1/B1 | 1 | 0 | 7, 15, 23, 31, 39 | 8 | 1 | 3 |
| 155 | A1/B1 | 16 | 0 | 4, 9, 14, 19, 24, 29, 34, 39 | 2 | 2 | 6 |
| 156 | A1/B1 | 16 | 1 | 3, 7, 11, 15, 19, 23, 27, 31, 35, 39 | 8 | 1 | 3 |
| 157 | A1/B1 | 8 | 1 | 4, 9, 14, 19, 24, 29, 34, 39 | 2 | 2 | 6 |
| 158 | A1/B1 | 8 | 1 | 3, 7, 11, 15, 19, 23, 27, 31, 35, 39 | 8 | 1 | 3 |
| 159 | A1/B1 | 4 | 1 | 4, 9, 14, 19, 24, 29, 34, 39 | 2 | 2 | 6 |
| 160 | A2/B2 | 1 | 0 | 4, 9, 14, 19, 24, 29, 34, 39 | 2 | 2 | 3 |
| 161 | A2/B2 | 1 | 0 | 4, 9, 14, 19, 24, 29, 34, 39 | 6 | 1 | 2 |
| 162 | A2/B2 | 1 | 0 | 24, 29, 34, 39 | 2 | 2 | 3 |
| 163 | A2/B2 | 1 | 0 | 24, 29, 34, 39 | 6 | 1 | 2 |
| 164 | A2/B2 | 1 | 0 | 17, 19, 37, 39 | 2 | 2 | 3 |
| 165 | A2/B2 | 1 | 0 | 17, 19, 37, 39 | 6 | 1 | 2 |
| 166 | A2/B2 | 1 | 0 | 0, 1, 2, . . . , 39 | 2 | 2 | 3 |
| 167 | A2/B2 | 1 | 0 | 0, 1, 2, . . . , 39 | 6 | 1 | 2 |
| 168 | A2/B2 | 1 | 0 | 23, 27, 31, 35, 39 | 2 | 2 | 3 |
| 169 | A2/B2 | 1 | 0 | 23, 27, 31, 35, 39 | 6 | 1 | 2 |
| 170 | A2/B2 | 1 | 0 | 3, 7, 11, 15, 19, 23, 27, 31, 35, 39 | 2 | 2 | 3 |
| 171 | A2/B2 | 1 | 0 | 3, 7, 11, 15, 19, 23, 27, 31, 35, 39 | 6 | 1 | 2 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 172 | A2/B2 | 1 | 0 | 1, 3, 5, 7, . . . , 37, 39 | 2 | 2 | 3 |
| 173 | A2/B2 | 1 | 0 | 7, 15, 23, 31, 39 | 2 | 2 | 3 |
| 174 | A2/B2 | 1 | 0 | 7, 15, 23, 31, 39 | 6 | 1 | 2 |
| 175 | A2/B2 | 16 | 0 | 4, 9, 14, 19, 24, 29, 34, 39 | 2 | 2 | 3 |
| 176 | A2/B2 | 16 | 1 | 3, 7, 11, 15, 19, 23, 27, 31, 35, 39 | 6 | 1 | 2 |
| 177 | A2/B2 | 8 | 1 | 4, 9, 14, 19, 24, 29, 34, 39 | 2 | 2 | 3 |
| 178 | A2/B2 | 8 | 1 | 3, 7, 11, 15, 19, 23, 27, 31, 35, 39 | 6 | 1 | 2 |
| 179 | A2/B2 | 4 | 1 | 4, 9, 14, 19, 24, 29, 34, 39 | 2 | 2 | 3 |
| 180 | A3/B3 | 1 | 0 | 4, 9, 14, 19, 24, 29, 34, 39 | 0 | 2 | 2 |
| 181 | A3/B3 | 1 | 0 | 4, 9, 14, 19, 24, 29, 34, 39 | 2 | 1 | 2 |
| 182 | A3/B3 | 1 | 0 | 24, 29, 34, 39 | 0 | 2 | 2 |
| 183 | A3/B3 | 1 | 0 | 24, 29, 34, 39 | 2 | 1 | 2 |
| 184 | A3/B3 | 1 | 0 | 17, 19, 37, 39 | 0 | 2 | 2 |
| 185 | A3/B3 | 1 | 0 | 17, 19, 37, 39 | 2 | 1 | 2 |
| 186 | A3/B3 | 1 | 0 | 0, 1, 2, . . . , 39 | 0 | 2 | 2 |
| 187 | A3/B3 | 1 | 0 | 0, 1, 2, . . . , 39 | 2 | 1 | 2 |
| 188 | A3/B3 | 1 | 0 | 23, 27, 31, 35, 39 | 0 | 2 | 2 |
| 189 | A3/B3 | 1 | 0 | 23, 27, 31, 35, 39 | 2 | 1 | 2 |
| 190 | A3/B3 | 1 | 0 | 3, 7, 11, 15, 19, 23, 27, 31, 35, 39 | 0 | 2 | 2 |
| 191 | A3/B3 | 1 | 0 | 3, 7, 11, 15, 19, 23, 27, 31, 35, 39 | 2 | 1 | 2 |
| 192 | A3/B3 | 1 | 0 | 1, 3, 5, 7, . . . , 37, 39 | 0 | 2 | 2 |
| 193 | A3/B3 | 1 | 0 | 7, 15, 23, 31, 39 | 0 | 2 | 2 |
| 194 | A3/B3 | 1 | 0 | 7, 15, 23, 31, 39 | 2 | 1 | 2 |
| 195 | A3/B3 | 16 | 0 | 4, 9, 14, 19, 24, 29, 34, 39 | 0 | 2 | 2 |
| 196 | A3/B3 | 16 | 1 | 3, 7, 11, 15, 19, 23, 27, 31, 35, 39 | 2 | 1 | 2 |
| 197 | A3/B3 | 8 | 1 | 4, 9, 14, 19, 24, 29, 34, 39 | 0 | 2 | 2 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 198 | A3/B3 | 8 | 1 | 3, 7, 11, 15, 19, 23, 27, 31, 35, 39 | 2 | 1 | 2 |
| 199 | A3/B3 | 4 | 1 | 4, 9, 14, 19, 24, 29, 34, 39 | 0 | 2 | 2 |
| 200 | C0 | 1 | 0 | 4, 9, 14, 19, 24, 29, 34, 39 | 2 | 2 | 6 |
| 201 | C0 | 1 | 0 | 4, 9, 14, 19, 24, 29, 34, 39 | 8 | 1 | 3 |
| 202 | C0 | 1 | 0 | 24, 29, 34, 39 | 2 | 2 | 6 |
| 203 | C0 | 1 | 0 | 24, 29, 34, 39 | 8 | 1 | 3 |
| 204 | C0 | 1 | 0 | 17, 19, 37, 39 | 2 | 2 | 6 |
| 205 | C0 | 1 | 0 | 17, 19, 37, 39 | 8 | 1 | 3 |
| 206 | C0 | 1 | 0 | 0, 1, 2, . . . , 39 | 2 | 2 | 6 |
| 207 | C0 | 1 | 0 | 0, 1, 2, . . . , 39 | 8 | 1 | 3 |
| 208 | C0 | 1 | 0 | 23, 27, 31, 35, 39 | 2 | 2 | 6 |
| 209 | C0 | 1 | 0 | 23, 27, 31, 35, 39 | 8 | 1 | 3 |
| 210 | C0 | 1 | 0 | 3, 7, 11, 15, 19, 23, 27, 31, 35, 39 | 2 | 2 | 6 |
| 211 | C0 | 1 | 0 | 3, 7, 11, 15, 19, 23, 27, 31, 35, 39 | 8 | 1 | 3 |
| 212 | C0 | 1 | 0 | 1, 3, 5, 7, . . . , 37, 39 | 2 | 2 | 6 |
| 213 | C0 | 1 | 0 | 7, 15, 23, 31, 39 | 2 | 2 | 6 |
| 214 | C0 | 1 | 0 | 7, 15, 23, 31, 39 | 8 | 1 | 3 |
| 215 | C0 | 16 | 0 | 4, 9, 14, 19, 24, 29, 34, 39 | 2 | 2 | 6 |
| 216 | C0 | 16 | 1 | 3, 7, 11, 15, 19, 23, 27, 31, 35, 39 | 8 | 1 | 3 |
| 217 | C0 | 8 | 1 | 4, 9, 14, 19, 24, 29, 34, 39 | 2 | 2 | 6 |
| 218 | C0 | 8 | 1 | 3, 7, 11, 15, 19, 23, 27, 31, 35, 39 | 8 | 1 | 3 |
| 219 | C0 | 4 | 1 | 4, 9, 14, 19, 24, 29, 34, 39 | 2 | 2 | 6 |
| 220 | C0 | 4 | 1 | 3, 7, 11, 15, 19, 23, 27, 31, 35, 39 | 8 | 1 | 3 |
| 221 | C0 | 2 | 1 | 4, 9, 14, 19, 24, 29, 34, 39 | 2 | 2 | 6 |
| 222 | C0 | 2 | 1 | 3, 7, 11, 15, 19, 23, 27, 31, 35, 39 | 8 | 1 | 3 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 223 | C0 | 1 | 0 | 13, 15, 21, 23, 29, 31, 37, 39 | 2 | 1 | 6 |
| 224 | C0 | 1 | 0 | 1, 3, 5, 7, . . . , 37, 39 | 8 | 1 | 3 |
| 225 | C0 | 1 | 0 | 9, 11, 13, 15, 17, 19, 29, 31, 33, 35, 37, 39 | 8 | 2 | 3 |
| 226 | C0 | 1 | 0 | 10, 11, 14, 15, 18, 19, 30, 31, 34, 35, 38, 39 | 8 | 2 | 3 |
| 227 | C0 | 1 | 0 | 13, 14, 15, 29, 30, 31, 37, 38, 39 | 8 | 2 | 3 |
| 228 | C2 | 1 | 0 | 4, 9, 14, 19, 24, 29, 34, 39 | 2 | 2 | 2 |
| 229 | C2 | 1 | 0 | 4, 9, 14, 19, 24, 29, 34, 39 | 8 | 1 | 1 |
| 230 | C2 | 1 | 0 | 24, 29, 34, 39 | 2 | 2 | 2 |
| 231 | C2 | 1 | 0 | 24, 29, 34, 39 | 8 | 1 | 1 |
| 232 | C2 | 1 | 0 | 17, 19, 37, 39 | 2 | 2 | 2 |
| 233 | C2 | 1 | 0 | 17, 19, 37, 39 | 8 | 1 | 1 |
| 234 | C2 | 1 | 0 | 0, 1, 2, . . . , 39 | 2 | 2 | 2 |
| 235 | C2 | 1 | 0 | 0, 1, 2, . . . , 39 | 8 | 1 | 1 |
| 236 | C2 | 1 | 0 | 23, 27, 31, 35, 39 | 2 | 2 | 2 |
| 237 | C2 | 1 | 0 | 23, 27, 31, 35, 39 | 8 | 1 | 1 |
| 238 | C2 | 1 | 0 | 3, 7, 11, 15, 19, 23, 27, 31, 35, 39 | 2 | 2 | 2 |
| 239 | C2 | 1 | 0 | 3, 7, 11, 15, 19, 23, 27, 31, 35, 39 | 8 | 1 | 1 |
| 240 | C2 | 1 | 0 | 1, 3, 5, 7, . . . , 37, 39 | 2 | 2 | 2 |
| 241 | C2 | 1 | 0 | 7, 15, 23, 31, 39 | 2 | 2 | 2 |
| 242 | C2 | 1 | 0 | 7, 15, 23, 31, 39 | 8 | 1 | 1 |
| 243 | C2 | 16 | 0 | 4, 9, 14, 19, 24, 29, 34, 39 | 2 | 2 | 2 |
| 244 | C2 | 16 | 1 | 3, 7, 11, 15, 19, 23, 27, 31, 35, 39 | 8 | 1 | 1 |
| 245 | C2 | 8 | 1 | 4, 9, 14, 19, 24, 29, 34, 39 | 2 | 2 | 2 |
| 246 | C2 | 8 | 1 | 3, 7, 11, 15, 19, 23, 27, 31, 35, 39 | 8 | 1 | 1 |
| 247 | C2 | 4 | 1 | 4, 9, 14, 19, 24, 29, 34, 39 | 2 | 2 | 2 |

TABLE 1-continued

| PRACH configuration index | Preamble sequence format | SFN mod x = y | | Slot index | Start symbol | Quantity of PRACH slots included in a slot corresponding to a subcarrier spacing of 60 kHz | Quantity of time-domain physical random access channel occasions included in a PRACH slot |
|---|---|---|---|---|---|---|---|
| | | x | y | | | | |
| 248 | C2 | 4 | 1 | 3, 7, 11, 15, 19, 23, 27, 31, 35, 39 | 8 | 1 | 1 |
| 249 | C2 | 2 | 1 | 4, 9, 14, 19, 24, 29, 34, 39 | 2 | 2 | 2 |
| 250 | C2 | 2 | 1 | 3, 7, 11, 15, 19, 23, 27, 31, 35, 39 | 8 | 1 | 1 |
| 251 | C2 | 1 | 0 | 13, 15, 21, 23, 29, 31, 37, 39 | 2 | 1 | 2 |
| 252 | C2 | 1 | 0 | 1, 3, 5, 7, . . . , 37, 39 | 8 | 1 | 1 |
| 253 | C2 | 1 | 0 | 9, 11, 13, 15, 17, 19, 29, 31, 33, 35, 37, 39 | 8 | 2 | 1 |
| 254 | C2 | 1 | 0 | 10, 11, 14, 15, 18, 19, 30, 31, 34, 35, 38, 39 | 8 | 2 | 1 |
| 255 | C2 | 1 | 0 | 13, 14, 15, 29, 30, 31, 37, 38, 39 | 8 | 2 | 1 |

In this embodiment of this application, slot indexes in any one of the following items (1) to (49) in Table 1 are configured by considering three factors: First, a slot identified by the slot index is in the second half of an uplink-downlink configuration period. Second, a slot identified by the slot index is a slot other than an optional slot of an SSB. Third, in all optional configurations of a CORESET, a slot identified by the slot index is a slot having a smallest collision probability with an optional time domain position of the CORESET. The slot indexes in the following items (1) to (49) are as follows:

(1) the slot indexes {17, 19, 37, 39} in the PRACH configuration index 4;

(2) the slot indexes {17, 19, 37, 39} in the PRACH configuration index 5;

(3) the slot indexes {13, 15, 21, 23, 29, 31, 37, 39} in the PRACH configuration index 23;

(4) the slot indexes {9, 11, 13, 15, 17, 19, 29, 31, 33, 35, 37, 39} in the PRACH configuration index 25;

(5) the slot indexes {10, 11, 14, 15, 18, 19, 30, 31, 34, 35, 38, 39} in the PRACH configuration index 25;

(6) the slot indexes {10, 11, 14, 15, 18, 19, 30, 31, 34, 35, 38, 39} in the PRACH configuration index 26;

(7) the slot indexes {13, 14, 15, 29, 30, 31, 37, 38, 39} in the PRACH configuration index 27;

(8) the slot indexes {17, 19, 37, 39} in the PRACH configuration index 32;

(9) the slot indexes {17, 19, 37, 39} in the PRACH configuration index 33;

(10) the slot indexes {13, 15, 21, 23, 29, 31, 37, 39} in the PRACH configuration index 51;

(11) the slot indexes {9, 11, 13, 15, 17, 19, 29, 31, 33, 35, 37, 39} in the PRACH configuration index 53;

(12) the slot indexes {10, 11, 14, 15, 18, 19, 30, 31, 34, 35, 38, 39} in the PRACH configuration index 54;

(13) the slot indexes {13, 14, 15, 29, 30, 31, 37, 38, 39} in the PRACH configuration index 55;

(14) the slot indexes {17, 19, 37, 39} in the PRACH configuration index 60;

(15) the slot indexes {17, 19, 37, 39} in the PRACH configuration index 61;

(16) the slot indexes {13, 15, 21, 23, 29, 31, 37, 39} in the PRACH configuration index 79;

(17) the slot indexes {9, 11, 13, 15, 17, 19, 29, 31, 33, 35, 37, 39} in the PRACH configuration index 81;

(18) the slot indexes {10, 11, 14, 15, 18, 19, 30, 31, 34, 35, 38, 39} in the PRACH configuration index 82;

(19) the slot indexes {13, 14, 15, 29, 30, 31, 37, 38, 39} in the PRACH configuration index 83;

(20) the slot indexes {17, 19, 37, 39} in the PRACH configuration index 88;

(21) the slot indexes {17, 19, 37, 39} in the PRACH configuration index 89;

(22) the slot indexes {13, 15, 21, 23, 29, 31, 37, 39} in the PRACH configuration index 107;

(23) the slot indexes {9, 11, 13, 15, 17, 19, 29, 31, 33, 35, 37, 39} in the PRACH configuration index 109;

(24) the slot indexes {10, 11, 14, 15, 18, 19, 30, 31, 34, 35, 38, 39} in the PRACH configuration index 110;

(25) the slot indexes {13, 14, 15, 29, 30, 31, 37, 38, 39} in the PRACH configuration index 111;

(26) the slot indexes {17, 19, 37, 39} in the PRACH configuration index 116;

(27) the slot indexes {17, 19, 37, 39} in the PRACH configuration index 117;

(28) the slot indexes {13, 15, 21, 23, 29, 31, 37, 39} in the PRACH configuration index 135;

(29) the slot indexes {9, 11, 13, 15, 17, 19, 29, 31, 33, 35, 37, 39} in the PRACH configuration index 137;

(30) the slot indexes {10, 11, 14, 15, 18, 19, 30, 31, 34, 35, 38, 39} in the PRACH configuration index 138;

(31) the slot indexes {13, 14, 15, 29, 30, 31, 37, 38, 39} in the PRACH configuration index 139;

(32) the slot indexes {17, 19, 37, 39} in the PRACH configuration index 144;

(33) the slot indexes {17, 19, 37, 39} in the PRACH configuration index 145;

(34) the slot indexes {17, 19, 37, 39} in the PRACH configuration index 164;

(35) the slot indexes {17, 19, 37, 39} in the PRACH configuration index 165;

(36) the slot indexes {17, 19, 37, 39} in the PRACH configuration index 184;

(37) the slot indexes {17, 19, 37, 39} in the PRACH configuration index 185;

(38) the slot indexes {17, 19, 37, 39} in the PRACH configuration index 204;

(39) the slot indexes {17, 19, 37, 39} in the PRACH configuration index 205;

(40) the slot indexes {13, 15, 21, 23, 29, 31, 37, 39} in the PRACH configuration index 223;

(41) the slot indexes {9, 11, 13, 15, 17, 19, 29, 31, 33, 35, 37, 39} in the PRACH configuration index 225;

(42) the slot indexes {10, 11, 14, 15, 18, 19, 30, 31, 34, 35, 38, 39} in the PRACH configuration index 226;

(43) the slot indexes {13, 14, 15, 29, 30, 31, 37, 38, 39} in the PRACH configuration index 227;

(44) the slot indexes {17, 19, 37, 39} in the PRACH configuration index 232;

(45) the slot indexes {17, 19, 37, 39} in the PRACH configuration index 233;

(46) the slot indexes {13, 15, 21, 23, 29, 31, 37, 39} in the PRACH configuration index 251;

(47) the slot indexes {9, 11, 13, 15, 17, 19, 29, 31, 33, 35, 37, 39} in the PRACH configuration index 253;

(48) the slot indexes {10, 11, 14, 15, 18, 19, 30, 31, 34, 35, 38, 39} in the PRACH configuration index 254; and 49) the slot indexes {13, 14, 15, 29, 30, 31, 37, 38, 39} in the PRACH configuration index 255.

It should be noted that a correspondence between a PRACH configuration index and a slot index is not limited in Table 1. One PRACH configuration index may correspond to a slot index in any row in Table 1. For example, the PRACH configuration index 1 in Table 1 may correspond to the slot indexes in the first row in Table 1, or may correspond to the slot indexes in the second row in Table 1, or may even correspond to the slot indexes in the $256^{th}$ row in Table 1.

It should be further noted that the configuration table is mainly used for use of a communication frequency band above 6 GHz, but is not limited to use of a communication frequency band below 6 GHz. In this embodiment of this application, for a communication frequency band below 6 GHz, a subcarrier spacing of a PRACH message may be 15 kHz or 30 kHz. For a communication frequency band above 6 GHz, a subcarrier spacing of a PRACH message may be 60 kHz or 120 kHz.

According to the solution of the present invention, a conflict between an optional time domain position of a RACH and a time domain position of a downlink resource such as an SSB or RSMI with a high priority can be avoided to a greatest extent, a quantity of valid ROs in the RACH configuration period is increased, a success rate of quickly sending an RACH resource by UE is increased, and random access efficiency is effectively improved. This can ensure that a particular sending interval is reserved between downlink signals such as an RO and an SSB, thereby improving RACH performance.

Figure 9:
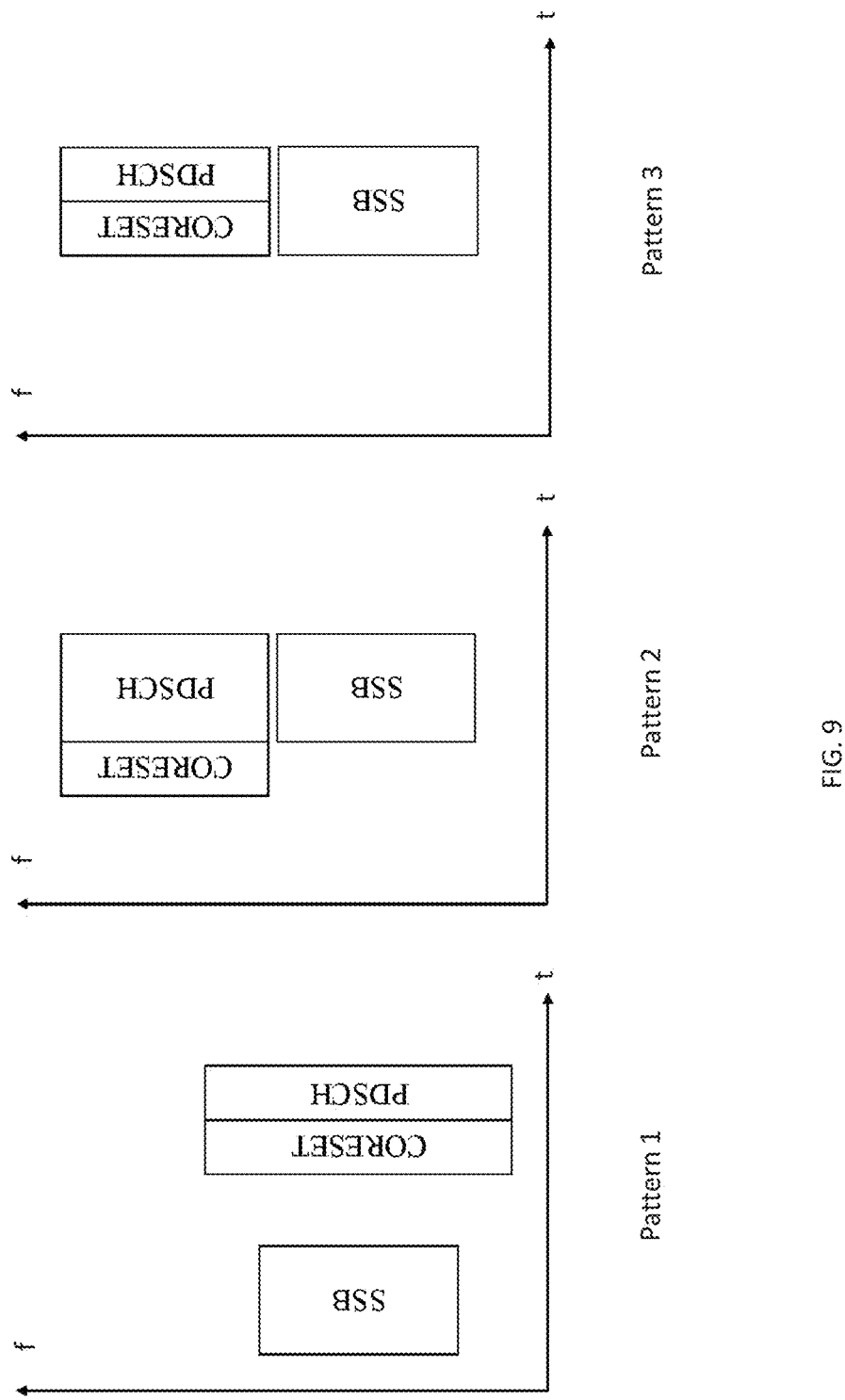
FIG. 9 is a schematic diagram of a control resource set multiplexing pattern according to an embodiment of this application.

The following first describes, with reference to FIG. 9, three SSB and control channel control resource set (for example, RMSI CORESET) multiplexing patterns (pattern) defined in NR based on a current NR protocol.

Three patterns (Pattern) shown in FIG. 9 are used as an example. Pattern 1: An SSB and a control channel control resource set (for example, an RMSI CORESET) are located at different moments, and a transmission bandwidth of the SSB and a transmission bandwidth including the control channel control resource set (for example, the RMSI CORESET) overlap. Pattern 2: An SSB and a control channel control resource set (for example, an RMSI CORESET) are located at different moments, and a transmission bandwidth of the SSB and a transmission bandwidth including the control channel control resource set (for example, the RMSI CORESET) do not overlap. Pattern 3: An SSB and a control channel control resource set (for example, an RMSI CORESET) are located at a same moment, and a transmission bandwidth of the SSB and a transmission bandwidth including the control channel control resource set (for example, the RMSI CORESET) do not overlap.

In current NR, for a communication frequency band below 6 GHz, subcarrier spacings corresponding to an SSB and a control channel control resource set are 15 kHz or 30 kHz. For a communication frequency band above 6 GHz, a subcarrier spacing corresponding to an SSB is 120 kHz or 240 kHz, and a subcarrier spacing corresponding to a control channel control resource set may be 60 kHz or 120 kHz.

A subcarrier spacing (subcarrier spacing, SCS) combination that is of an SSB and a control channel control resource set and that is supported by the NR includes: {SSB SCS, CORESET SCS}={15, 15}, {15, 30}, {30, 15}, {30, 30}, {120, 60}, {120, 120}, {240, 60}, {240, 120}} kHz.

A configuration table of a control channel control resource set provided in the prior art cannot satisfy a requirement for a transmission block size of a system information data channel (for example, an RMSI PDSCH). Therefore, the configuration table needs to be redesigned.

The following describes technical solutions of this application with reference to accompanying drawings.

It should be understood that, in this application, a channel and a signal are sometimes interchangeably used, but meanings of the channel and the signal can be understood by a person skilled in the art.

It should be understood that the table shown in this application is only a presentation manner of configuration information, each row of the table may exist independently or may be combined with any one or more rows, and correspondences between the indexes and the following four columns in this application may be changed. For example, the configuration table may be presented as:

| 4 | 3 | 96 | 2 | −20 if a condition A is satisfied; or −21 if a condition B is satisfied |
|---|---|----|---|---| or,

| 5 | 3 | 96 | 2 | −20 if a condition A is satisfied; or −21 if a condition B is satisfied |
|---|---|----|---|---| or,

| 8 | 3 | 96 | 2 | −20 if a condition A is satisfied; or −21 if a condition B is satisfied |

The network device in this application may be a device configured to communicate with a terminal device. The network device may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

The communications device in this application may include UE and/or a network device.

A common signal in this application may include a synchronization signal and/or a broadcast channel, and the common signal may be designed as an SSB, namely, a synchronization signal/broadcast channel block (SS/BCH block). Further, the synchronization signal includes a primary synchronization signal and a secondary synchronization signal. It should be understood that the common signal may further include another signal. Details are not described herein in this application.

The multiplexing pattern in this application is an emission pattern of at least two signals in a time domain dimension and/or a frequency domain dimension, for example, may include a control channel control resource set and common signal multiplexing pattern; or may include a pattern multiplexing a control channel control resource set, a broadcast service channel corresponding to the control channel, and a common signal. Herein, the broadcast service channel corresponding to the control channel may be at least one of a service channel that carries system information, a service channel that carries paging information, and a service channel that carries a random access response.

The control channel in this application is a channel for transmitting control information between a network device and UE. Usually, a channel for sending control information by the network device to the UE is referred to as a downlink control channel or a physical downlink control channel. The control channel in this application may include one or more of the following control channels: a control channel for (transmitting) system information, a control channel for (transmitting) paging, and a control channel for (transmitting) a random access response/request. It should be understood that this application may further include another control channel. Details are not described herein.

The control resource set in this application may be a time-frequency resource set of the control channel, and is a time-frequency resource range used by the UE to perform blind detection on the control channel. The control resource set herein may include an RMSI CORESET, an OSI CORESET, a paging CORESET, and the like.

The time domain resource size in this application is a time domain resource occupied when a signal or a channel is actually transmitted, for example, one or more OFDM symbols or one or more slots.

The frequency domain resource size in this application is a frequency domain resource occupied when a signal or a channel is actually transmitted, for example, one or more REs (resource element) or one or more resource blocks (RB). The RB is a frequency domain length, and includes 12 subcarriers or 12 (physical) resource elements (RE).

The resource position in this application is a minimum resource block index in frequency domain during actual transmission of a signal or a channel, and is represented by using a frequency domain offset, defined by using a subcarrier spacing of a control resource set, between a minimum resource block index of the control resource set and a minimum common resource block index overlapping the first resource block of a common signal block.

The transmission block (TB) in this application is a quantity of information bits that can be carried on a data channel (for example, an RMSI PDSCH).

In this application, a maximum transmission block size that needs to be supported by a system information data channel is 1700 bits. For the pattern 3 of an SSB and a control channel control resource set, a time domain length occupied by the SSB is equal to a sum of a time domain length occupied by the control channel control resource set and a time domain length occupied by a data channel, and the time domain length occupied by the SSB and the sum are both four OFDM symbols. Based on a current configuration table of a control channel control resource set (as shown in Table), for the pattern 3, a time domain resource in the control channel control resource set is two OFDM symbols, and a maximum frequency domain resource is 48 (physical) resource blocks (RB). After 288 (physical) resource elements (RE) occupied by a DMRS are removed, data channel may be carried. For example, a time-frequency resource of a physical downlink shared channel PDSCH has only 48×2× 12−288=1152−288=864 (physical) resource elements (RE). If quadrature phase shift keying (QPSK) modulation is used for a control channel, maximum spectral efficiency that can be supported is 1.3262, and a transmission block size that can be supported by a corresponding data channel (for example, a PDSCH) is only 1146 bits. Therefore, the current configuration table of the control channel control resource set cannot satisfy a requirement for a transmission block size of the control channel.

TABLE 1

| Index | SS/PBCH block and control resource set multiplexing pattern | Number of RBs $N_{RB}^{CORESET}$ | Number of Symbols $N_{symb}^{CORESE}$ | Offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if a condition A is satisfied; or −21 if a condition B is satisfied |
| 5 | 3 | 24 | 2 | 24 |
| 6 | 3 | 48 | 2 | −20 if a condition A is satisfied; or −21 if a condition B is satisfied |
| 7 | 3 | 48 | 2 | 48 |
| 8 | Reserved | | | |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

A subcarrier spacing of the SSB and a subcarrier spacing of the control resource set are 120 kHz; SS/PBCH block and control resource set multiplexing pattern indicates an SSB and control resource set multiplexing pattern; Number of RBs indicates a frequency domain resource size, namely, a quantity of (physical) resource blocks; Number of Symbols indicates a time domain resource size, namely, a quantity of symbols (for example, OFDM symbols); and offset indicates a frequency domain resource position, namely, a frequency domain offset, defined by using the subcarrier spacing of the control resource set, between a minimum resource block index of the control resource set and a minimum common resource block index overlapping the first resource block of a common signal block. (The offset is defined with respect to the subcarrier spacing of the control resource set from the smallest RB index of the control resource set for Type0-PDCCH common search space to the smallest RB index of the common RB overlapping the first RB of the SS/PBCH block.)

Example 1

With reference to Table 2, Table 3, and Table 4, this application provides a signal detection method. The method includes the following steps.

S101. User equipment receives indication information sent by a network device. The indication information is used to indicate configuration information of a control channel control resource set. The network device may add the indication information to a common signal and send the common signal to the user equipment. For example, the network device adds the indication information to four most significant bits of SSB RMSI-PDCCH-Config. The indication information may be an index in Table 1 and/or any one of the following tables.

S102. The user equipment determines a time domain resource size, a frequency domain resource size, and a resource position of the control resource set based on the indication information. The frequency domain resource size is 96 resource blocks and/or 192 resource blocks, the control resource set and a common signal block are frequency division multiplexed, and a subcarrier spacing of a control channel is 120 kHz.

With reference to any one of Table 1 to Table 4, using Table 4 as an example, if the indication information is 9, the configuration information of the control channel control resource set includes: An SSB and control resource set multiplexing pattern is 3, a frequency domain resource size (namely, a quantity of resource blocks) is 96, a time domain resource size (namely, a quantity of OFDM symbols) is 2, and a resource position (namely, a frequency domain offset) is 96.

Optionally, the time domain resource size is two OFDM symbols.

Optionally, the resource position is a frequency domain difference of −20 resource blocks or −21 resource blocks, defined by using the subcarrier spacing of the control resource set, between a minimum resource block index of the control resource set and a minimum common resource block index overlapping the first resource block of the common signal block.

Optionally, the resource position is a frequency domain difference of 96 resource blocks, defined by using the subcarrier spacing of the control resource set, between a minimum resource block index of the control resource set and a minimum common resource block index overlapping the first resource block of the common signal block.

Optionally, the resource position is a frequency domain difference of 192 resource blocks, defined by using the subcarrier spacing of the control resource set, between a minimum resource block index of the control resource set and a minimum common resource block index overlapping the first resource block of the common signal block.

This application provides a signal detection method. The method includes the following steps.

S201. User equipment receives indication information sent by a network device, where the indication information is used to indicate configuration information of a control channel control resource set.

S202. The user equipment determines the configuration information of the control resource set based on a configuration table and the indication information.

Optionally, in the configuration table, a configuration in which a frequency domain resource is 24 RBs and/or 48 RBs in Table 1 is replaced with a configuration in which a frequency domain resource is 96 RBs and/or 192 RBs, for example, as shown in Table 2.

TABLE 2

| Index | SSB and control resource set multiplexing pattern | Quantity $N_{RB}^{CORESET}$ of resource blocks | Quantity $N_{symb}^{CORESE}$ of OFDM symbols | Frequency domain offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 96 | 2 | −20 if a condition A is satisfied; or −21 if a condition B is satisfied |
| 5 | 3 | 96 | 2 | 96 |
| 6 | 3 | 192 | 2 | −20 if the condition A is satisfied; or −21 if the condition B is satisfied |
| 7 | 3 | 192 | 2 | 192 |
| 8 | Reserved | | | |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

Optionally, in the configuration table, a configuration in which a frequency domain resource is 96 RBs is added to Table 1, for example, as shown in Table 3.

TABLE 3

| Index | SSB and control resource set multiplexing pattern | Quantity $N_{RB}^{CORESET}$ of resource blocks | Quantity $N_{symb}^{CORESE}$ of OFDM symbols | Frequency domain offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if a condition A is satisfied; or |

TABLE 3-continued

| Index | SSB and control resource set multiplexing pattern | Quantity $N_{RB}^{CORESET}$ of resource blocks | Quantity $N_{symb}^{CORESET}$ of OFDM symbols | Frequency domain offset (RBs) |
|---|---|---|---|---|
| 5 | 3 | 24 | 2 | 24 |
| 6 | 3 | 48 | 2 | −20 if the condition A is satisfied; or −21 if the condition B is satisfied |
| 7 | 3 | 48 | 2 | 48 |
| 8 | 3 | 96 | 2 | −20 if the condition A is satisfied; or −21 if the condition B is satisfied |
| 9 | 3 | 96 | 2 | 96 |
| 10 | | Reserved | | |
| 11 | | Reserved | | |
| 12 | | Reserved | | |
| 13 | | Reserved | | |
| 14 | | Reserved | | |
| 15 | | Reserved | | |

Optionally, in the configuration table, a configuration in which a frequency domain resource is 96 RBs and a configuration in which a frequency domain resource is 192 RBs are added to Table 1, for example, as shown in Table 4.

TABLE 4

| Index | SSB and control resource set multiplexing pattern | Quantity $N_{RB}^{CORESET}$ of resource blocks | Quantity $N_{symb}^{CORESET}$ of OFDM symbols | Frequency domain offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if a condition A is satisfied; or −21 if a condition B is satisfied |
| 5 | 3 | 24 | 2 | 24 |
| 6 | 3 | 48 | 2 | −20 if the condition A is satisfied; or −21 if the condition B is satisfied |
| 7 | 3 | 48 | 2 | 48 |
| 8 | 3 | 96 | 2 | −20 if the condition A is satisfied; or −21 if the condition B is satisfied |
| 9 | 3 | 96 | 2 | 96 |
| 10 | 3 | 192 | 2 | −20 if the condition A is satisfied; or −21 if the condition B is satisfied |
| 11 | 3 | 192 | 2 | 192 |
| 12 | | Reserved | | |
| 13 | | Reserved | | |
| 14 | | Reserved | | |
| 15 | | Reserved | | |

The condition A indicates a parameter $k_0=0$, and the condition B indicates a parameter $k_0>0$. For a definition of the parameter $k_0$, refer to chapter 4 in TS 38.211. $k_0=0$ indicates a case in which a synchronization raster is aligned with a channel raster. $k_0>0$ indicates a case in which a synchronization raster is not aligned with a channel raster.

According to the method in this application, a requirement for a transmission block size of a system information data channel (for example, an RMSI PDSCH) is met. Specifically, a frequency domain resource is 96 RBs, a time domain resource is two OFDM symbols, and after 576 physical resource elements (RE) occupied by a DMRS are removed, time-frequency resources that can carry a data channel have 96×2×12−576=2304−576=1728 physical resource elements (RE); and if QPSK modulation is used for the control channel, maximum spectral efficiency that can be supported is 1.3262, and a maximum transmission block size that can be supported by a corresponding data channel (for example, an RMSI CORESET) may be up to 2292 bits; or a frequency domain resource is 192 RBs, a time domain resource is two OFDM symbols, and after 1152 physical resource elements (RE) occupied by a DMRS are removed, time-frequency resources that can carry a data channel have 192×2×12−1152=4608−1152=3456 physical resource elements (RE); and if QPSK modulation is used for the control channel, maximum spectral efficiency that can be supported is 1.3262, and a maximum transmission block size that can be supported by a corresponding data channel (for example, an RMSI CORESET) may be up to 4583 bits.

Figure 5:
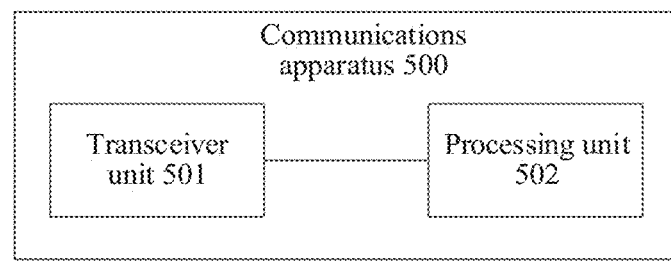
FIG. 5 is a schematic structural diagram of a communications apparatus according to an embodiment of this application.

Based on a same inventive concept, as shown in FIG. 5, an embodiment of this application further provides a communications apparatus 500. The communications apparatus 500 may be applied to a terminal device. The apparatus 500 may be a processor, a chip, a chip system, a functional module, or the like in the terminal device. The apparatus 500 may include a transceiver unit 501 and a processing unit 502. The processing unit 502 is configured to control and manage an action of the apparatus 500.

In an example of this application, the transceiver unit 501 may be configured to receive first information. The first information is used to indicate one or more first time units in a random access system frame, the one or more first time units are determined based on one or more time units in a configuration table, the one or more time units in the configuration table are determined based on an uplink-downlink configuration period and a second time unit, the one or more first time units are an optional time domain resource of a random access sequence, and the second time unit is an optional time domain resource of a synchronization channel block. The processing unit 502 may be configured to determine, based on the first information, a time domain resource for sending the random access sequence.

In another example of this application, the transceiver unit 501 may be configured to receive first information. The processing unit 502 may be configured to determine, based on the first information, a time domain resource for sending a random access sequence.

The first information is used to indicate one or more first time units in a random access system frame, the one or more first time units are determined based on one or more time units in a configuration table, and the one or more first time units are an optional time domain resource of the random access sequence.

One or more indexes, in the random access system frame, of the one or more time units in the configuration table satisfy one or more of the following conditions:

the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms;

the one or more indexes, in the random access system frame, of the one or more time units in the configuration table include one or more of {10, 11, 14, 15, 18, 19, 30, 31, 34, 35, 38, 39} if the uplink-downlink configuration period is 1 ms;

the one or more indexes, in the random access system frame, of the one or more time units in the configuration table include one or more of {4, 9, 13, 14, 18, 19, 29, 33, 34, 38, 39} if the uplink-downlink configuration period is 1.25 ms;

the one or more indexes, in the random access system frame, of the one or more time units in the configuration table include one or more of {4, 12, 13, 14, 15, 29, 30, 31, 36, 37, 38, 39} if the uplink-downlink configuration period is 2 ms;

the one or more indexes, in the random access system frame, of the one or more time units in the configuration table include one or more of {9, 15, 16, 17, 18, 19, 29, 35, 36, 37, 38, 39} if the uplink-downlink configuration period is 2.5 ms; or the one or more indexes, in the random access system frame, of the one or more time units in the configuration table include one or more of {10, 11, 12, 13, 14, 15, 16, 17, 18, 19, 30, 31, 32, 33, 34, 35, 36, 37, 38, 39} if the uplink-downlink configuration period is 5 ms.

Figure 6:
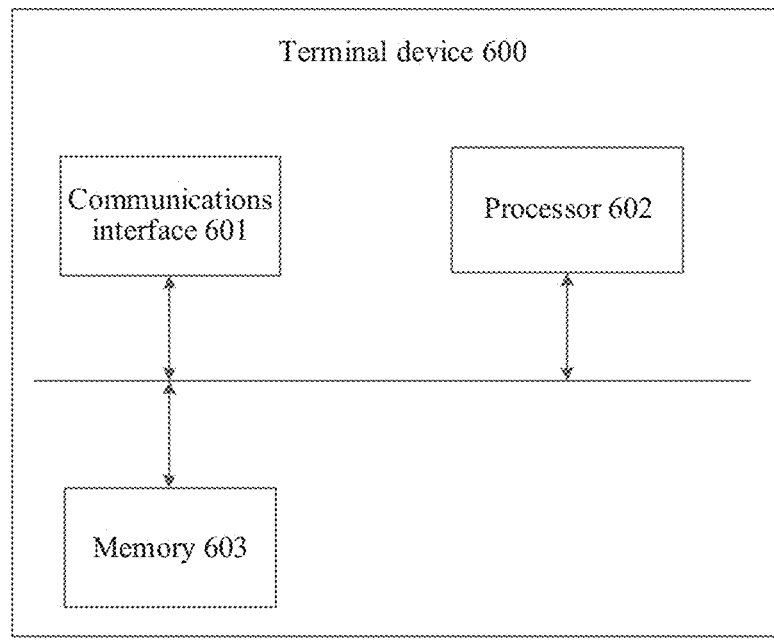
FIG. 6 is a schematic structural diagram of a terminal device according to an embodiment of this application.

An embodiment of this application further provides a structure of a terminal device 600. As shown in FIG. 6, the terminal device 600 may include a communications interface 601 and a processor 602. Optionally, the terminal device 600 may further include a memory 603. The memory 603 may be disposed inside the terminal device, or may be disposed outside the terminal device. As shown in FIG. 5, the processing unit 502 may be implemented by using the processor 602. The transceiver unit 501 may be implemented by using the communications interface 601. The processor 602 receives information or a message by using the communications interface 601, and is configured to implement the methods performed by the terminal device shown in FIG. 2 and FIG. 4. In an implementation procedure, steps of a processing procedure may be implemented by using an integrated logic circuit of hardware in the processor 602 or an instruction in a form of software, to implement the methods performed by the terminal device in FIG. 2 and FIG. 4.

The communications interface 601 in this embodiment of this application may be a circuit, a bus, a transceiver, or any other apparatus that can be used to exchange information.

It should be noted that a specific connection medium between the communications interface 601, the processor 602, and the memory 603 is not limited in this embodiment of this application. In this embodiment of this application, in FIG. 6, the memory 603, the processor 602, and the communications interface 601 are connected by using a bus. The bus is represented by using a thick line in FIG. 6, and a connection manner between other components is merely used for schematic description, and is not limited thereto. The bus may be classified into an address bus, a data bus, a control bus, and the like. For ease of representation, only one thick line is used to represent the bus in FIG. 6, but this does not mean that there is only one bus or only one type of bus.

Figure 7:
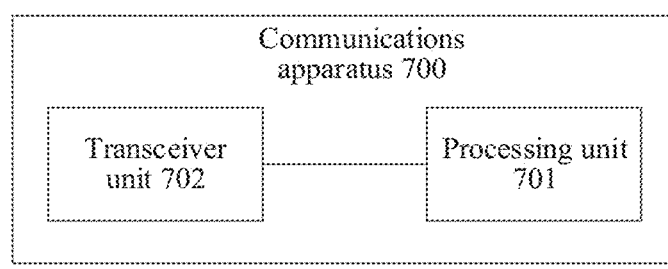
FIG. 7 is a schematic structural diagram of a communications apparatus according to an embodiment of this application.

Based on a same inventive concept, as shown in FIG. 7, an embodiment of this application further provides a communications apparatus 700. The communications apparatus 700 is applied to a network device. The apparatus 700 may be specifically a processor, a chip, a chip system, a functional module, or the like in the network device. The apparatus 700 may include a processing unit 701 and a transceiver unit 702. The processing unit 701 is configured to control and manage an action of the apparatus 700.

In an example of this application, the processing unit 701 is configured to determine first information, and the transceiver unit 702 is configured to send the first information. The first information is used to indicate one or more first time units in a random access system frame, the one or more first time units are determined by the network device based on one or more time units in a configuration table, the one or more time units in the configuration table are determined based on an uplink-downlink configuration period and a second time unit, the one or more first time units are an optional time domain resource of a random access sequence, and the second time unit is an optional time domain resource of a synchronization channel block.

In another example of this application, the processing unit 701 may be configured to determine first information. The first information is used to indicate one or more first time units in a random access system frame, the one or more first time units are determined based on one or more time units in a configuration table, and the one or more first time units are an optional time domain resource of a random access sequence. The transceiver unit 702 may be configured to send the first information.

One or more indexes, in the random access system frame, of the one or more time units in the configuration table satisfy one or more of the following conditions:

the one or more indexes, in the random access system frame, of the one or more time units in the configuration table include one or more of {9, 11, 13, 15, 17, 19, 29, 31, 33, 35, 37, 39} if the uplink-downlink configuration period is 0.5 ms;

the one or more indexes, in the random access system frame, of the one or more time units in the configuration table include one or more of {10, 11, 14, 15, 18, 19, 30, 31, 34, 35, 38, 39} if the uplink-downlink configuration period is 1 ms;

the one or more indexes, in the random access system frame, of the one or more time units in the configuration table include one or more of {4, 9, 13, 14, 18, 19, 29, 33, 34, 38, 39} if the uplink-downlink configuration period is 1.25 ms;

the one or more indexes, in the random access system frame, of the one or more time units in the configuration table include one or more of {4, 12, 13, 14, 15, 29, 30, 31, 36, 37, 38, 39} if the uplink-downlink configuration period is 2 ms;

the one or more indexes, in the random access system frame, of the one or more time units in the configuration table include one or more of {9, 15, 16, 17, 18, 19, 29, 35, 36, 37, 38, 39} if the uplink-downlink configuration period is 2.5 ms; or the one or more indexes, in the random access system frame, of the one or more time units in the configuration table include one or more of {10, 11, 12, 13, 14, 15, 16, 17, 18, 19, 30, 31, 32, 33, 34, 35, 36, 37, 38, 39} if the uplink-downlink configuration period is 5 ms.

Figure 8:
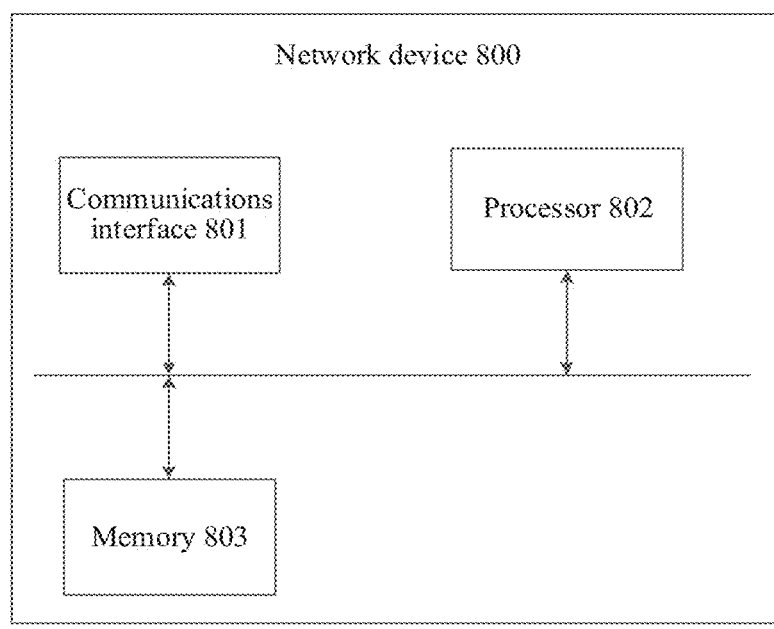
FIG. 8 is a schematic structural diagram of a network device according to an embodiment of this application.

An embodiment of this application further provides a structure of a network device. As shown in FIG. 8, the network device 800 may include a communications interface 801 and a processor 802. Optionally, the network device 800 may further include a memory 803. The memory 803 may be disposed inside the network device, or may be disposed outside the network device. As shown in FIG. 7, the processing unit 701 may be implemented by using the processor 802. The transceiver unit 702 may be implemented by using the communications interface 801. The processor 802 receives information or a message by using the communications interface 801, and is configured to implement the methods performed by the network device shown in FIG. 2 and FIG. 4. In an implementation process, steps of a processing procedure may be implemented by using an integrated logic circuit of hardware in the processor 802 or an instruction in a form of software, to implement the methods performed by the network device in FIG. 2 and FIG. 4.

The communications interface 801 in this embodiment of this application may be a circuit, a bus, a transceiver, or any other apparatus that can be used to exchange information.

It should be noted that a specific connection medium between the communications interface 801, the processor 802, and the memory 803 is not limited in this embodiment of this application. In this embodiment of this application, in FIG. 8, the memory 803, the processor 802, and the communications interface 801 are connected by using a bus. The bus is represented by using a thick line in FIG. 8, and a connection manner between other components is merely a schematic description rather than a limitation. The bus may be classified into an address bus, a data bus, a control bus, and the like. For ease of representation, only one thick line is used to represent the bus in FIG. 8, but this does not mean that there is only one bus or only one type of bus.

Based on the foregoing embodiments, an embodiment of this application further provides a computer storage medium. The storage medium stores a software program, and when the software program is read and executed by one or more processors, the methods according to any one or more of the foregoing embodiments may be implemented. The computer storage medium may include: any medium that can store program code, such as a removable hard disk, a read-only memory, a random access memory, a magnetic disk, or an optical disc.

Based on the foregoing embodiments, an embodiment of this application further provides a chip, and the chip includes a processor, configured to implement functions in any one or more of the foregoing embodiments, for example, obtain or process information or a message in the foregoing method. Optionally, the chip further includes a memory, and the memory is configured to store a necessary program instruction and data to be executed by the processor. The chip system may include a chip, or may include a chip and another discrete device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. A communications method, comprising:
receiving, by a terminal device, a random access configuration index, wherein there is a correspondence between the random access configuration index and a time domain resource in a random access system frame, and wherein the time domain resource is obtained by dividing the random access system frame into intervals based on an uplink-downlink configuration period, and the time domain resource comprises one or more slots in the intervals of the random access system frame, the uplink-downlink configuration period being 2.5 millisecond (ms) or 5 millisecond, and the time domain resource in the random access system frame comprising slots with slot indexes {17, 19, 37, 39}, or the uplink-downlink configuration period being 2 millisecond and the time domain resource in the random access system frame comprising slots with slot indexes {13, 14, 15, 29, 30, 31, 37 38, 39};
determining, by the terminal device, the time domain resource based on the random access configuration index and the correspondence; and
communicating, by the terminal device, with a network device based on the time domain resource.

2. The method according to claim 1, wherein the time domain resource does not overlap a time domain resource of a synchronization channel block.

3. The method according to claim 1, wherein the random access configuration index corresponds to one or more of following information: a preamble sequence format, a configuration period parameter, a system frame number, a start symbol, a quantity of slots, or a quantity of physical random access channel occasions (ROs) comprised in one slot.

4. The method according to claim 1, wherein the correspondence is pre-determined, with the time domain resource of the correspondence being determined based on the uplink-downlink configuration period and a time domain resource of a synchronization channel block in the random access system frame, wherein the random access system frame is divided into a plurality of time domain intervals based on the uplink-downlink configuration period, and the time domain resource comprises one or more resources in the plurality of time domain intervals excluding the time domain resource of the synchronization channel block.

5. The method according to claim 4, wherein the time domain resource is determined by:
determining the plurality of time domain intervals based on the uplink-downlink configuration period, wherein each time domain interval comprises N time units, and N is an integer greater than or equal to 1; and
determining the time domain resource in second $$\lfloor \frac{N}{2} \rfloor$$

time units in each time domain interval excluding the time domain resource of the synchronization channel block.

6. A communications method, comprising:
sending a random access configuration index, wherein the random access configuration index indicates a time domain resource in a random access system frame, wherein the time domain resource is obtained by dividing the random access system frame into intervals based on an uplink-downlink configuration period, and the time domain resource comprises one or more slots in the intervals of the random access system frame, the uplink-downlink configuration period being 2.5 millisecond (ms) or 5 millisecond, and the time domain resource in the random access system frame comprising slots with slot indexes {17, 19, 37, 39}, or the uplink-downlink configuration period being 2 millisecond, and the time domain resource in the random access system frame comprising slots with slot indexes {13, 14, 15, 29, 30, 31, 37 38, 39}; and
communicating with a terminal device based on the time domain resource.

7. The method according to claim 6, wherein the time domain resource does not overlap a time domain resource of a synchronization channel block.

8. The method according to claim 6, wherein the random access configuration index corresponds to one or more of following information: a preamble sequence format, a configuration period parameter, a system frame number, a start symbol, a quantity of slots, or a quantity of physical random access channel occasions (ROs) comprised in one slot.

9. A communications apparatus, comprising:
a transceiver, configured to receive a random access configuration index, wherein there is a correspondence between the random access configuration index and a time domain resource in a random access system frame, wherein the time domain resource is obtained by dividing the random access system frame into intervals based on an uplink-downlink configuration period, and the time domain resource comprises one or more slots in the intervals of the random access system frame, the uplink-downlink configuration period being 2.5 millisecond (ms) or 5 millisecond, and the time domain resource in the random access system frame comprising slots with slot indexes {17, 19, 37, 39}, or the uplink-downlink configuration period being 2 millisecond, and the time domain resource in the random access system frame comprising slots with slot indexes {13, 14, 15, 29, 30, 31, 37, 38, 39}; and
a processor, configured to determine the time domain resource based on the random access configuration index and the correspondence; and
wherein the transceiver unit is further configured to communicate with a network device based on the time domain resource.

10. The apparatus according to claim 9, wherein the time domain resource does not overlap a time domain resource of a synchronization channel block.

11. The apparatus according to claim 9, wherein the random access configuration index corresponds to one or more of following information: a preamble sequence format, a configuration period parameter, a system frame number, a start symbol, a quantity of slots, or a quantity of physical random access channel occasions (ROs) comprised in one slot.

12. The apparatus according to claim 9, wherein the correspondence is pre-determined, with the time domain resource of the correspondence being determined based on the uplink-downlink configuration period and a time domain resource of a synchronization channel block in the random access system frame, wherein the random access system frame is divided into a plurality of time domain intervals based on the uplink-downlink configuration period, and the time domain resource comprises one or more resources in the plurality of time domain intervals excluding the time domain resource of the synchronization channel block.

13. The apparatus according to claim 12, wherein the time domain resource is determined by:
determining the plurality of time domain intervals based on the uplink-downlink configuration period, wherein each time domain interval comprises N time units, and N is an integer greater than or equal to 1; and
determining the time domain resource in second $$\lfloor \frac{N}{2} \rfloor$$

time units in each time domain interval excluding the time domain resource of the synchronization channel block.

14. A communications apparatus, comprising:
a transceiver, configured to send a random access configuration index, wherein the random access configuration index indicates a time domain resource in a random access system frame, wherein the time domain resource is obtained by dividing the random access system frame into intervals based on an uplink-downlink configuration period, and the time domain resource comprises one or more slots in the intervals of the random access system frame, the uplink-downlink configuration period being 2.5 millisecond (ms) or 5 millisecond, and the time domain resource in the random access system frame comprising slots with slot indexes {17, 19, 37, 39}, or the uplink-downlink configuration period being 2 millisecond, and the time domain resource in the random access system frame comprising slots with slot indexes {13, 14, 15, 29, 30, 31, 37 38, 39}; and a processor, configured to communicate with a terminal device based on the time domain resource.

\* \* \* \* \*

UNITED STATES PATENT AND TRADEMARK OFFICE
CERTIFICATE OF CORRECTION

PATENT NO. : 11,528,751 B2
APPLICATION NO. : 17/039581
DATED : December 13, 2022
INVENTOR(S) : Lui et al.

It is certified that error appears in the above-identified patent and that said Letters Patent is hereby corrected as shown below:

On the Title Page

Item (54) Title and in the Specification, Column 1, Lines 1-3; delete "METHOD AND APPARATUS FOR RESOURCE ALLOCATION USING RANDOM ACCESS CONFIGURATION INFORMATION" and insert --A METHOD AND APPARATUS FOR RESOURCE ALLOCATION USING RANDOM ACCESS CONFIGURATION INFORMATION--.

In the Specification

In the Summary, Column 4, Line 2; delete "{1, 11, 14, 15," and insert --{10,11,14,15"--.

In the Summary, Column 8, Line 2; delete "{1, 11, 14, 15," and insert --{10,11,14,15"--.

Signed and Sealed this
Seventeenth Day of January, 2023

Katherine Kelly Vidal
*Director of the United States Patent and Trademark Office*